US008786920B2

(12) United States Patent
Mikami

(10) Patent No.: US 8,786,920 B2
(45) Date of Patent: Jul. 22, 2014

(54) IMAGE READING APPARATUS

(71) Applicant: Canon Kabushiki Kaisha, Tokyo (JP)

(72) Inventor: Ryo Mikami, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/917,583

(22) Filed: Jun. 13, 2013

(65) Prior Publication Data

US 2013/0278979 A1  Oct. 24, 2013

Related U.S. Application Data

(62) Division of application No. 12/855,480, filed on Aug. 12, 2010, now Pat. No. 8,488,219.

(30) Foreign Application Priority Data

Sep. 9, 2009  (JP) ................................. 2009-208205

(51) Int. Cl.
*H04N 1/04* (2006.01)
(52) U.S. Cl.
USPC ............ 358/509; 358/475; 358/474; 382/275
(58) Field of Classification Search
CPC .............................. H04N 1/00023; H04N 1/04
USPC .......... 358/505, 474, 475, 514, 515, 516.483, 358/497; 382/254, 275
See application file for complete search history.

(56) References Cited

U.S. PATENT DOCUMENTS

| 5,523,786 | A |   | 6/1996  | Parulski ........................ 348/269 |
| 5,721,628 | A | * | 2/1998  | Takaragi et al. ............. 358/518 |
| 5,894,356 | A | * | 4/1999  | Yoo ................................ 358/515 |
| 5,973,802 | A | * | 10/1999 | Hirota et al. .................. 358/521 |
| 6,765,703 | B1 |   | 7/2004  | Watanabe ...................... 358/514 |
| 6,804,033 | B1 | * | 10/2004 | Hara .............................. 358/522 |
| 6,958,835 | B2 | * | 10/2005 | Sakakibara et al. .......... 358/514 |
| 7,327,962 | B2 |   | 2/2008  | Shoji et al. ........................ 399/9 |
| 7,349,134 | B2 | * | 3/2008  | Kato ............................. 358/482 |
| 7,355,760 | B2 |   | 4/2008  | Yoshihara et al. ............ 358/474 |
| 7,486,414 | B2 |   | 2/2009  | Arai ............................... 358/1.9 |
| 7,551,328 | B2 | * | 6/2009  | Kondo et al. ................. 358/474 |
| 7,626,735 | B2 |   | 12/2009 | Mizuhashi et al. ........... 358/474 |
| 7,672,019 | B2 | * | 3/2010  | Misaka ....................... 358/3.27 |

(Continued)

FOREIGN PATENT DOCUMENTS

| JP | 61-035066 | 2/1986 |
| JP | 63-078666 | 4/1988 |

(Continued)

*Primary Examiner* — Negussie Worku
(74) *Attorney, Agent, or Firm* — Fitzpatrick, Cella, Harper & Scinto

(57) ABSTRACT

An image reading apparatus includes: a light source to illuminate an original; a color sensor and a monochrome sensor to receive light reflected from the original illuminated by the light source to output an image signal; an amplifier to amplify the image signal from the color and monochrome sensors; a reflective reference member; and a control circuit to adjust a gain of the amplifier amplifying the image signal from the color sensor that receives light reflected from the reflective member illuminated by the light source, and holds the adjusted gain as a gain setting value for the color sensor, and the control circuit obtains a gain setting value for the monochrome sensor by calculation based on the gain setting value for the color sensor.

6 Claims, 14 Drawing Sheets

(56) References Cited

U.S. PATENT DOCUMENTS

| | | | |
|---|---|---|---|
| 7,675,658 B2 | 3/2010 | Sakakibara | 358/514 |
| 7,733,538 B2 * | 6/2010 | Kanesaka et al. | 358/474 |
| 7,782,496 B2 | 8/2010 | Tsukahara et al. | 358/446 |
| 7,864,386 B2 | 1/2011 | Tanimoto et al. | 358/496 |
| 7,903,302 B2 * | 3/2011 | Sakakibara | 358/513 |
| 7,936,477 B2 * | 5/2011 | Sakakibara | 358/1.9 |
| 7,936,919 B2 | 5/2011 | Kameyama | 382/167 |
| 7,990,582 B2 | 8/2011 | Ide et al. | 358/474 |
| 8,049,908 B2 | 11/2011 | Shoda | 358/1.13 |
| 8,094,209 B2 * | 1/2012 | Egawa | 348/225.1 |
| 8,104,686 B2 * | 1/2012 | Hawley et al. | 235/462.2 |
| 8,144,375 B2 | 3/2012 | Tanimoto et al. | 358/474 |
| 8,243,171 B2 * | 8/2012 | LeGall et al. | 348/240.99 |
| 8,432,586 B2 * | 4/2013 | Hamano et al. | 358/505 |
| 8,437,047 B2 * | 5/2013 | Muraishi | 358/3.26 |
| 2003/0053157 A1 | 3/2003 | Sakakibara et al. | 358/514 |
| 2010/0302602 A1 | 12/2010 | Mikami | 358/406 |
| 2011/0096375 A1 | 4/2011 | Mikami | 358/475 |

FOREIGN PATENT DOCUMENTS

| | | |
|---|---|---|
| JP | 63-287161 | 11/1988 |
| JP | 06-133166 | 5/1994 |
| JP | 2002-111968 | 4/2002 |
| JP | 2005-051334 | 2/2005 |
| JP | 2007-213439 | 8/2007 |

* cited by examiner

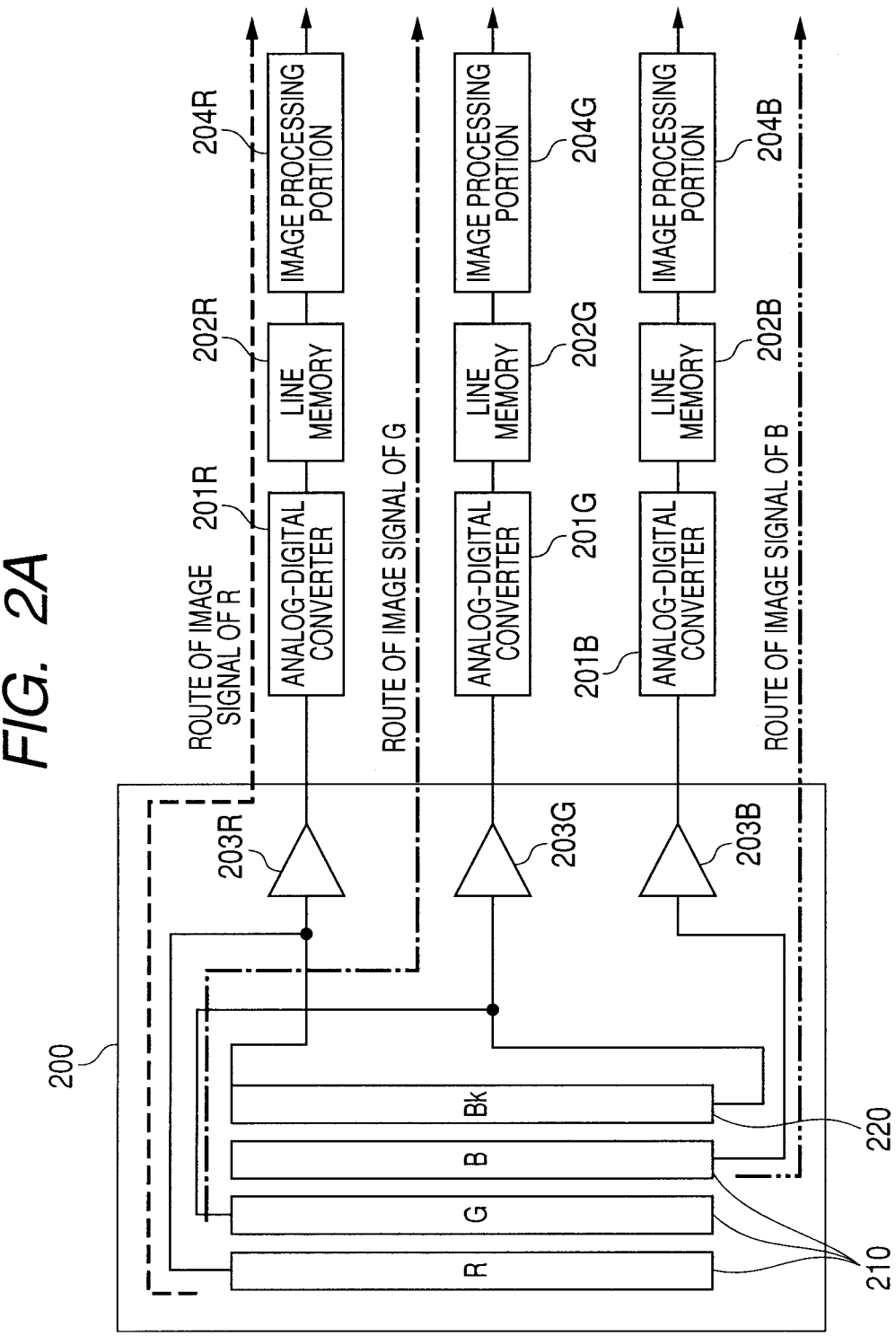

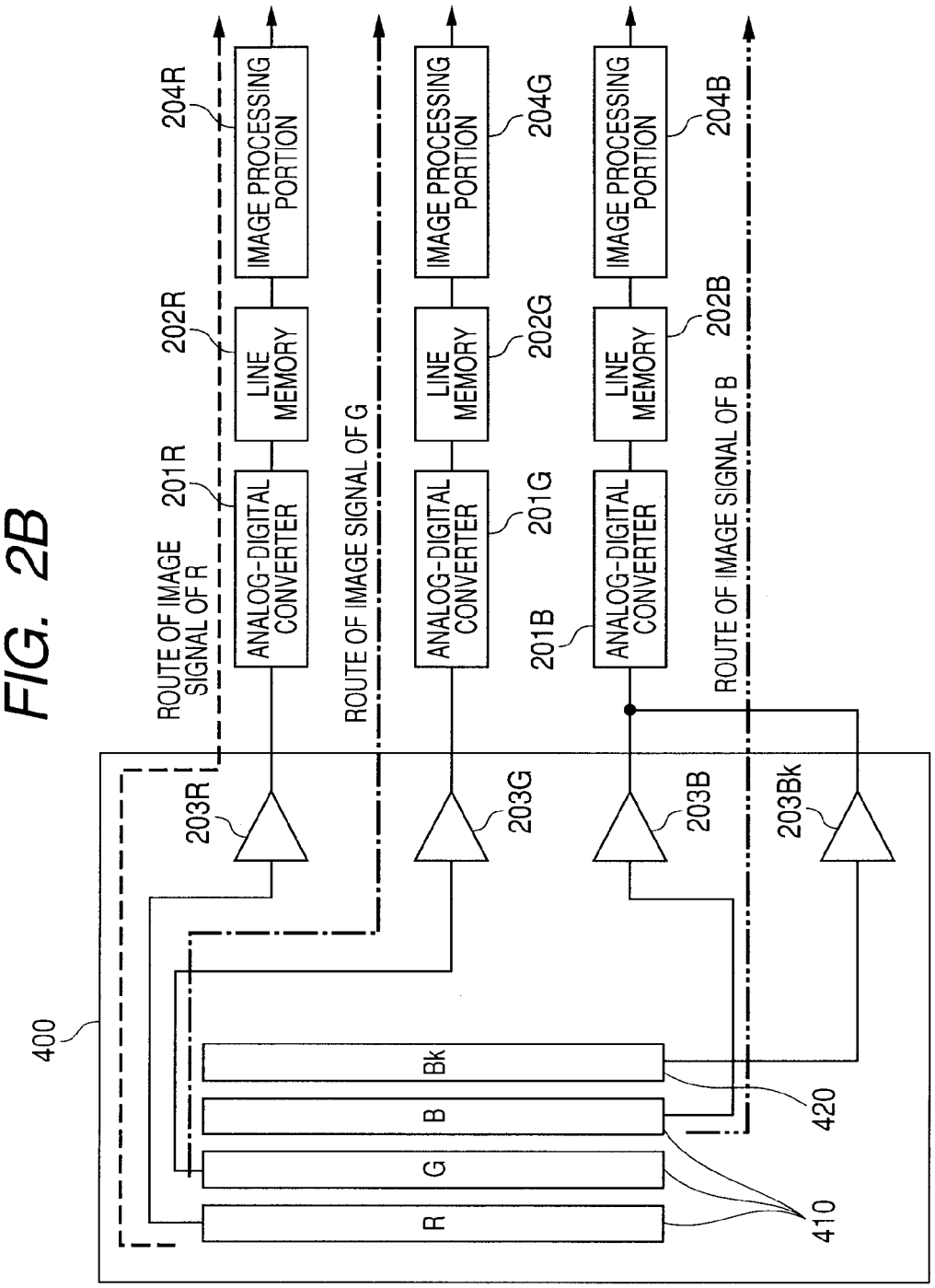

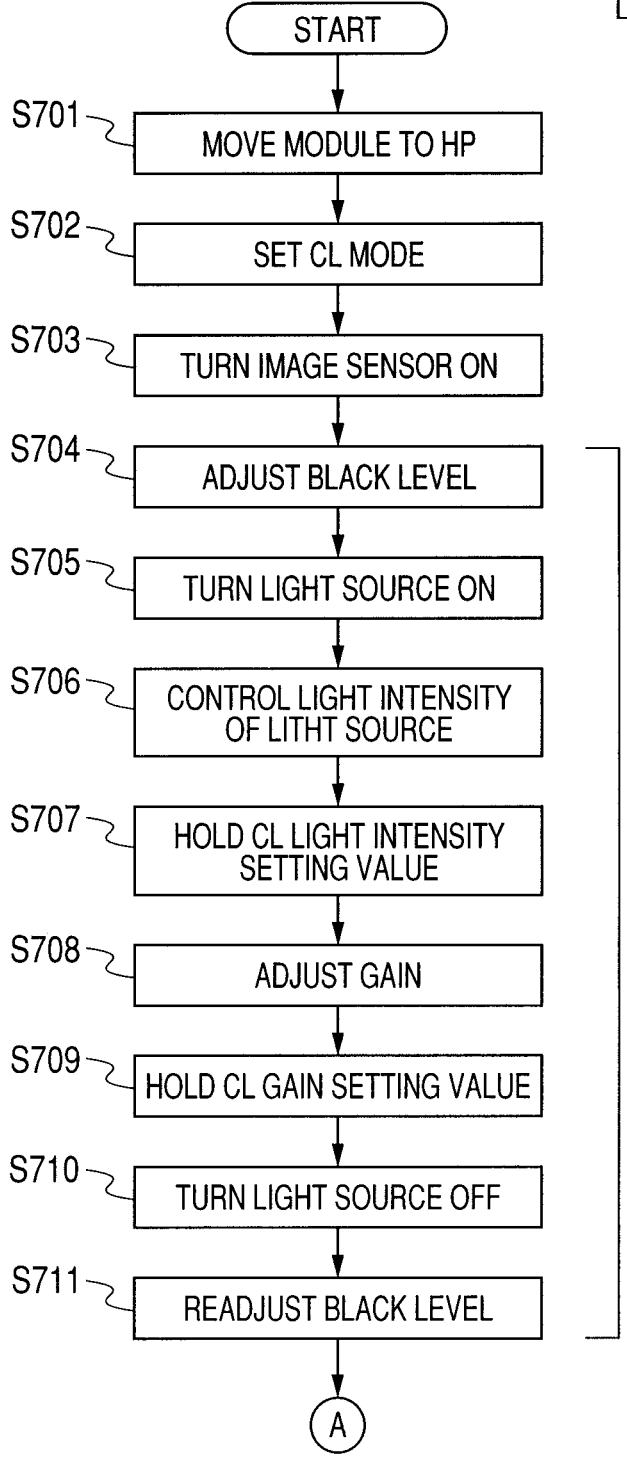

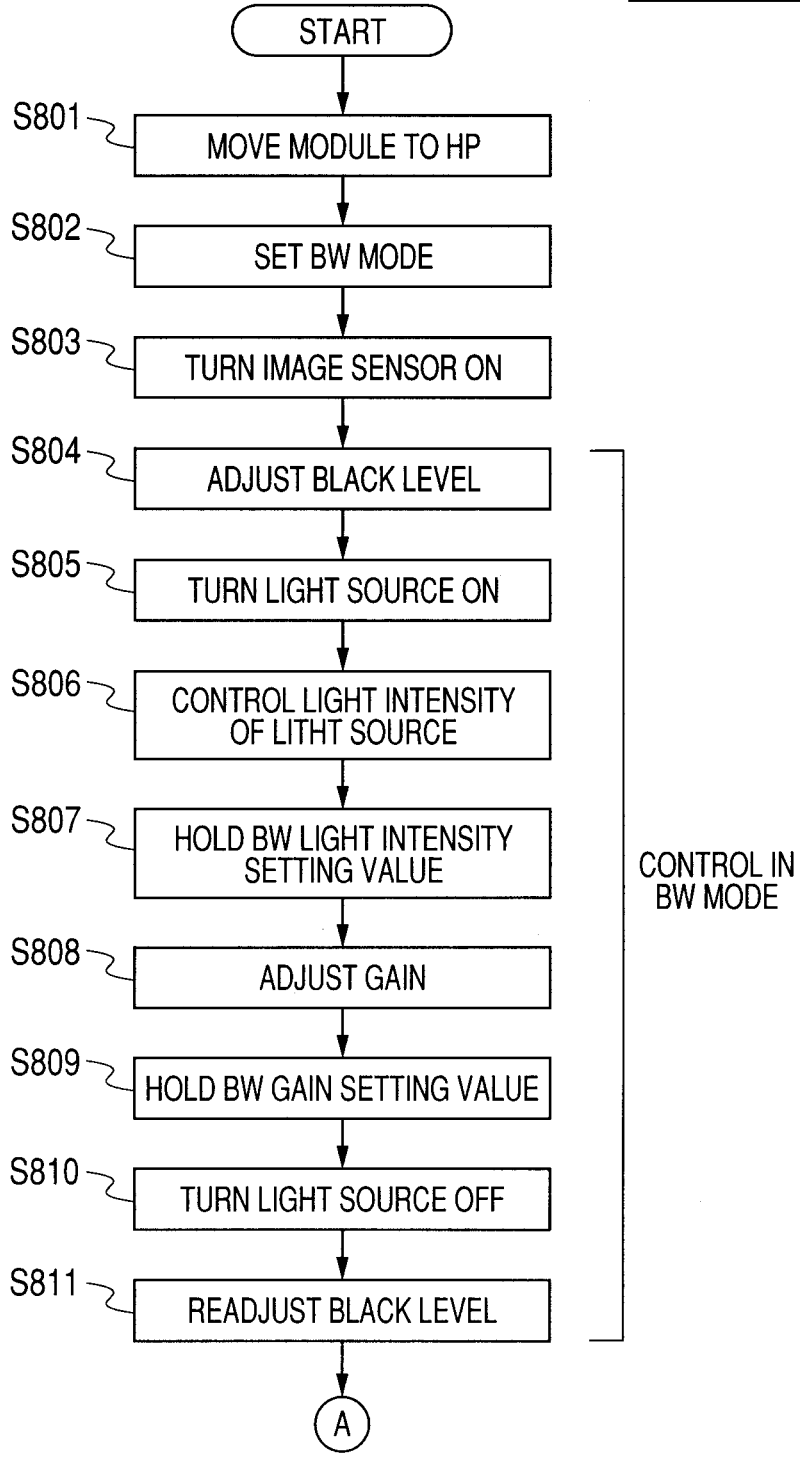

IMAGE READING APPARATUS

This application is a divisional of U.S. patent application Ser. No. 12/855,480, filed Aug. 12, 2010 (currently pending), which is incorporated by reference herein in its entirety, as if fully set forth herein, and claims the benefit of priority under 35 U.S.C. §119, based on Japanese Priority Application No. 2009-208205, filed Sep. 9, 2009, which is incorporated by reference herein in its entirety, as if fully set forth herein.

BACKGROUND OF THE INVENTION

1. Field of the Invention

The present invention relates to an image reading apparatus capable of reducing the time it takes to perform initial adjustment.

2. Description of the Related Art

Conventionally, a reading apparatus capable of reading a color original in color (hereinafter referred to as a color reading apparatus) generally uses a three-line sensor having color filters of three colors: red (R), green (G), and blue (B).

On the other hand, a reading apparatus that is prepared for reading both a color original and a monochrome original in black and white (hereinafter referred to as a monochrome reading apparatus) uses a line sensor without a color filter, or a line sensor having a color filter with desired spectral sensitivity. In this case, a green-based color filter is used often due to luminosity function characteristics of a human's eye.

In recent years, the colorization of a printing output of a printer and a copier is advancing. Even in the field of scanning (computerization) of an original, a color reading apparatus capable of reading an original in color is spreading. In this case, in order to enable color reading, a three-line sensor is usually adopted as described above.

However, conventionally, the read speed of a monochrome reading apparatus is generally higher than that of a color reading apparatus. Therefore, there is a demand for providing monochrome reading mode capable of reading an original at a speed higher than that of color reading mode in a color reading apparatus.

For example, in the following cases, it is desired that an original is read in monochrome reading mode using a line sensor of one color and one line.

(1) The case where it is previously known that an original is a monochrome original, and a monochrome output is desired instead of a three-color output of RGB as a read signal.

(2) The case where it is desired that a read image is output by a high-speed monochrome printer or a read image is output in a monochrome color at a high speed and at a low cost even by a color printer.

(3) The case where it is desired that the amount of scan data (electronic data) of an original is reduced.

Under such circumstances, a four-line image sensor including a three-line sensor for color (hereinafter referred to as a color sensor) and a line sensor for monochrome (hereinafter referred to as a monochrome sensor) has been developed. Here, the photoelectron accumulation time of the sensor can be shortened by setting the transmittance of the monochrome sensor to be higher than that of the color sensor. That is, the monochrome sensor is capable of reading an original at a higher speed than the color sensor.

For example, Japanese Patent Application Laid-Open No. 2002-111968 discloses an image reading apparatus using a four-line image sensor as a light receiving element. Actually, color reading mode and monochrome reading mode are not selected simultaneously. Then, the sensor itself can be miniaturized by setting a series of paths through which image data in monochrome reading mode (hereinafter referred to as a monochrome mode) flows to be in common with those of color reading mode (hereinafter referred to as a color mode) for the purpose of reducing an analog-digital converter and an image processing portion.

Conventionally, in an image reading apparatus, an output of each image sensor is adjusted by an AD (analog-digital) converter immediately after an application of power so that the output falls within a predetermined input range.

In the image reading apparatus, it is necessary to perform the adjustment of a light intensity of a light source and an analog gain (hereinafter referred to as an initial adjustment) after an application of power. In the case of using a four-line image sensor in which a color mode and a monochrome mode have a common image data path, the sensitivity of a color sensor is different from that of a monochrome sensor, and hence, the initial adjustment needs to be performed respectively for the color mode and the monochrome mode. Therefore, there is a problem that the time it takes to perform the initial adjustment becomes simply twice. On the other hand, in a four-line image sensor having image data paths separately for the color mode and the monochrome mode, the adjustment of both the modes can be completed with one adjustment; however, it is not realistic from the viewpoint of a practical use, a circuit scale, and the like.

Further, in recent years, a power-saving mode such as a standby mode (standby) or sleep mode (sleep) tends to be mounted in preparation for the case where a copier is not operated for a predetermined period of time, from the viewpoint of energy saving of equipment. In an apparatus having a power-saving mode, every time the power-saving mode returns to a normal operation mode, the adjustment of an analog gain and a light intensity of a light source (initial adjustment) are required. Performing initial adjustment twice for the color mode and the monochrome mode every time the apparatus returns from the power-saving mode to the normal operation mode is a substantial problem considering a length of time before the start of reading.

SUMMARY OF THE INVENTION

The present invention provides an image reading apparatus capable of reducing a length of time before the start of an initial reading operation.

Further, the present invention provides an image reading apparatus capable of reducing the time it takes to perform initial adjustment.

The image reading apparatus of the present invention has a configuration in which a gain setting value for a monochrome sensor is calculated based on a gain setting value for a color sensor obtained by adjustment.

In order to attain the above-mentioned objects, an image reading apparatus includes: a light source configured to illuminate an original; a color sensor and a monochrome sensor configured to receive light reflected from the original illuminated by the light source to output an image signal, the color sensor being a sensor configured to output a color image signal, and the monochrome sensor being a sensor configured to output a monochrome image signal; an amplifier configured to amplify the image signal from the color sensor and the monochrome sensor; a reflective reference member; and a control circuit configured to adjust a gain of the amplifier amplifying the image signal from the color sensor that receives light reflected from the reflective reference member illuminated by the light source, to hold the adjusted gain as a gain setting value for the color sensor, wherein the control circuit obtains a gain setting value for the monochrome sensor by calculation, based on the gain setting value for the color sensor.

Further features of the present invention will become apparent from the following description of exemplary embodiments with reference to the attached drawings.

BRIEF DESCRIPTION OF THE DRAWINGS

FIG. 2A is a schematic diagram of a configuration of a four-line sensor of an image sensor.

FIG. 2B is a schematic diagram of another image sensor.

DESCRIPTION OF THE EMBODIMENTS

[Embodiment 1]

Hereinafter, embodiments of the present invention are described with reference to the attached drawings.

(Image Reading Apparatus)

Figure 1A:
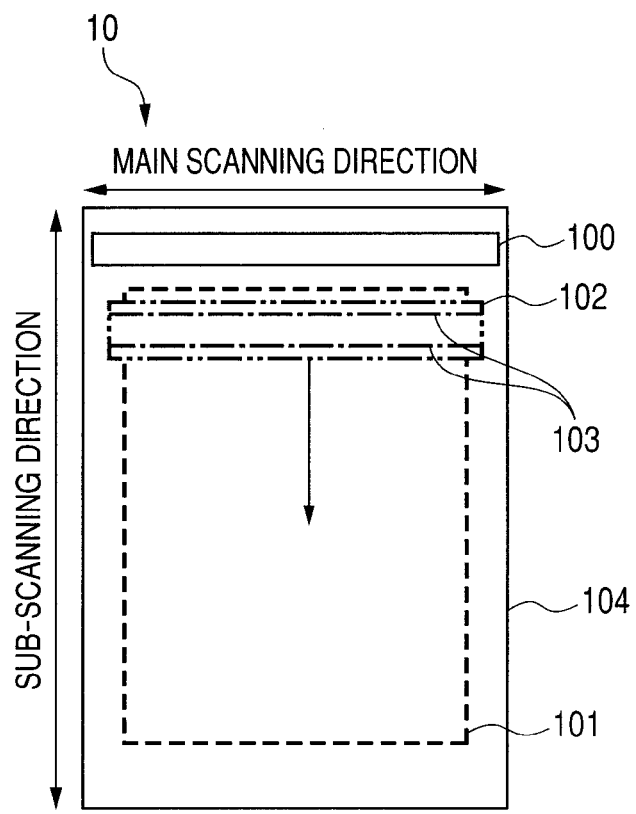
FIG. 1A is a plan view of an image reading apparatus of Embodiment 1 according to the present invention.
Figure 1B:
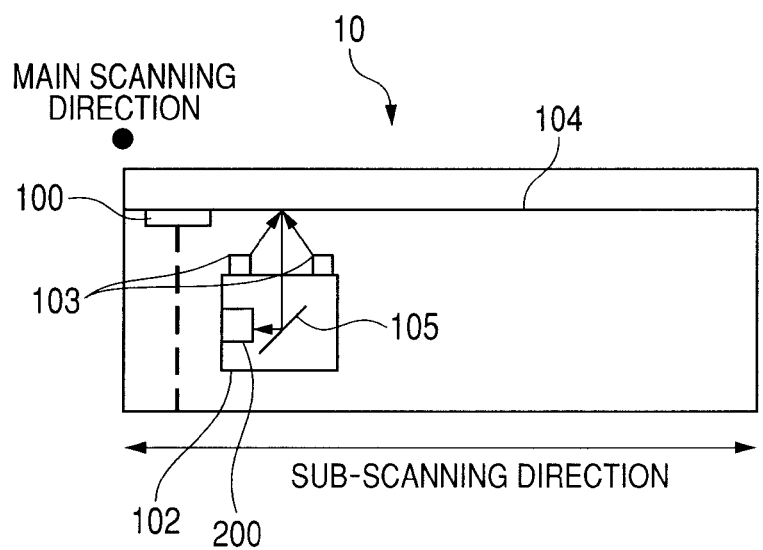
FIG. 1B is a left side surface cross-sectional view of the image reading apparatus.

FIGS. 1A and 1B illustrate an entire configuration of an image reading apparatus 10 of Embodiment 1 according to the present invention. FIG. 1A is a plan view of the image reading apparatus 10. FIG. 1B is a left side surface cross-sectional view of the image reading apparatus 10.

A shading white plate (reflective reference member) 100 is attached to a lower surface (on the side of an image reading module 102) of an original glass plate 104. The white plate 100 is slightly larger in a main scanning direction, compared with an original area 101 of the original glass plate 104 on which an original is to be placed. The light intensity of a light source 103 for illuminating an original (hereinafter referred to as a light source) and a gain of an analog output of an image sensor 200 are adjusted based on the white plate 100. The image reading module 102 is integrally provided with the light source 103, the image sensor 200, and a mirror 105. The mirror 105 directs light of the light source 103 reflected by an original on the original glass plate 104, to the image sensor 200. The image reading apparatus 10 may employ, instead of the image reading module 102, an image reading unit in which an image sensor and a lens unit are fixed at predetermined places in a sub-scanning direction and a light source and a mirror are moved in the sub-scanning direction. When performing the adjustment of a light intensity and an analog gain (hereinafter referred to as an initial adjustment), the image reading module 102 is moved just below the white plate 100. The reflected light obtained when the white plate 100 is illuminated with light from the light source 103 is read by the image sensor 200 in the image reading module 102. The initial adjustment is performed based on image data obtained from an output signal of the image sensor 200.

(Image Sensor)

FIGS. 2A and 2B are schematic views of configurations of a four-line sensor of the image sensor 200. The image sensor 200 illustrated in FIG. 2A includes a color sensor 210 and a monochrome sensor 220. The color sensor 210 includes an R line sensor having a red filter, a G line sensor having a green filter, and a B line sensor having a blue filter. The monochrome sensor 220 includes a Bk line sensor having no color filter or having a light green filter. The image sensor 200 further includes line memories (not shown), shift registers (not shown), and output amplifiers 203 (203R, 203G, 203B). The color sensor 210 and the monochrome sensor 220 of the image sensor 200 receive light reflected from an original illuminated by the light source 103 and output an analog signal. More specifically, the light respectively received by the R, G, B, Bk line sensors of the image sensor 200 are converted into electric signals, which are then stored in the line memories (not shown) in the image sensor 200. The electric signals serially output by the shift registers (not shown) are taken out of the image sensor 200 as analog signals via the output amplifiers 203R, 203G, and 203B, respectively. The analog signals are converted into digital signals by AD converters 201 (201R, 201G, 201B), respectively. The digital signals are then stored in the line memories 202 (202R, 202G, 202B) as image data. The image data is subjected to various image processing such as shading correction in image processing portions 204 (204R, 204G, 204B). Memories may be used instead of the line memories 202.

In a color reading mode (hereinafter referred to as a color mode), the output signals of the color sensor (R, G, B line sensors) 210 are transferred to the image processing portions 204 through R, G, B image signal routes illustrated in FIG. 2A. In a monochrome reading mode (hereinafter referred to as a monochrome mode), the output signal of the monochrome sensor (Bk line sensor) 220 is output from the image sensor 200 through one route or plural routes of the image signal routes for color. In the case of the embodiment illustrated in FIG. 2A, the output signals of all the pixels of the Bk line sensor are output from the image sensor 200 through the R image signal route and the G image signal route. The Bk line sensor 220 is not coated with a color filter or coated with a filter of color lighter than an ordinary color filter. Therefore, the accumulation time for obtaining a predetermined output value can be shortened compared with the color sensor 210. By shortening the accumulation time (by driving at a frequency higher than that of the color mode), the Bk line sensor 220 reads an image at a high speed. As illustrated in FIG. 2A, in the case where the output signal of the Bk line sensor 220 is output with all the pixels in the main scanning direction being divided, using multiple image signal routes, an image can be read at an even higher speed. In the case of the embodiment of FIG. 2A, signals of pixels in a first half of the Bk line sensor are output through the R image signal route, and signals of pixels in a second half of the Bk line sensor are output using the G image signal route.

FIG. 2A illustrates an example of a configuration in which the output of the color sensor 210 and the output of the monochrome sensor 220 can be switched in the image sensor 200 in order to omit the line memories (not shown) and the shift registers (not shown) in the image sensor 200. However, for example, as illustrated in FIG. 2B, line memories (not shown), shift registers (not shown), and output amplifiers 203 (203R, 203G, 203B, 203Bk) may be provided for the respective R, G, B, and Bk line sensors of an image sensor 400. Then, the output of the color sensor 410 and the output of a monochrome sensor 420 may be switched outside of the image sensor 400. The output signals of the color sensor (R, G, B line sensors) 410 are input to the AD converters 201 (201R, 201G, 201B), for example, as illustrated in FIG. 2B. The output signal of the monochrome sensor (Bk line sensor) 420 is input to the AD converter 201B on the B image signal route, for example, as illustrated in FIG. 2B.

(Control Block)

Figure 3A:
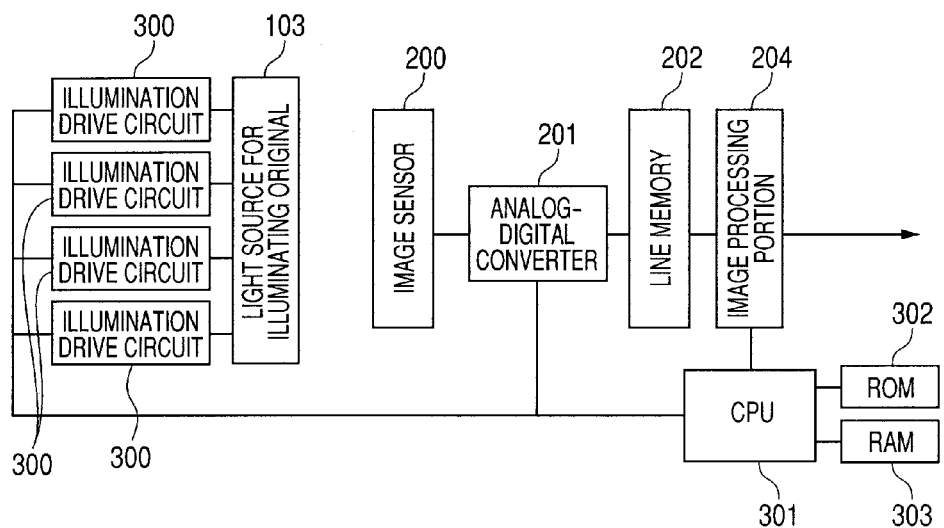
FIG. 3A is a block diagram of a control system of the image reading apparatus according to the present invention.

FIG. 3A is a control block diagram of the image reading apparatus according to the present invention. In order to adjust a light intensity from the light source 103 so that an analog output from the image sensor 200 does not exceed the maximum allowable input range of the AD converter 201, a current to be supplied to the light source 103 is controlled by illumination drive circuits 300. In the embodiment illustrated in FIG. 3A, the light source 103 is an LED. In FIG. 3A, although four illumination drive circuits 300 are illustrated, the number of the illumination drive circuits 300 is not limited to four. The light source 103 includes multiple light-emitting units. The variation in a light intensity in the main scanning direction of the light source 103 may be reduced by controlling the multiple light-emitting units with the multiple illumination drive circuits 300.

On the other hand, a xenon lamp (rare gas phosphor lamp) (hereinafter referred to as a Xe lamp) may be used, instead of the LED, as the light source 103. In this case, the illumination drive circuit 300 is not a drive current control circuit as in the case of using an LED as the light source, but is generally a high-voltage inverter. The ON/OFF control of the high-voltage inverter is performed by a central processing unit (CPU) (control circuit) 301. Light from the Xe lamp illuminates an original on the original glass plate 104 via optical components such as a mirror and a lens. The image sensor 200 receives light reflected from the original and outputs an image signal as an analog output. A Xe lamp of an appropriate light intensity and a high-voltage inverter are selected so that the analog output from the image sensor 200 does not exceed a maximum allowable input range of the AD converter 201. The CPU (control circuit) 301 performs operations regarding the initial adjustment of the image reading apparatus 10 described later and setting of various registers, in addition to the turn-on and turn-off of the light source. The CPU 301 is connected to a read-only memory (ROM) 302 and a random-access memory (RAM) 303. The ROM 302 stores a program regarding the initial adjustment. The RAM 303 stores operation results of the CPU 301 regarding the initial adjustment.

Figure 3B:
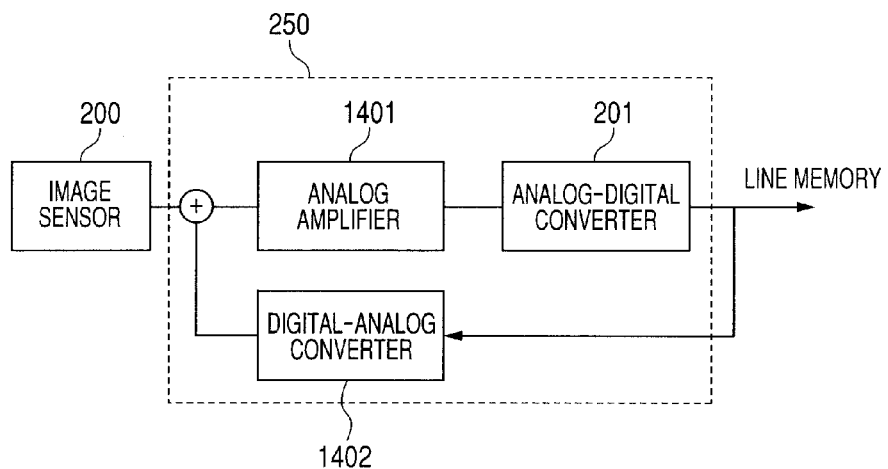
FIG. 3B is a schematic diagram of an analog front end integrated circuit (AFE).

The AD converter 201 of FIG. 3A will be further described. In practice, the AD converter 201 is hardly used alone, and as illustrated in FIG. 3B, an analog amplifier 1401 is provided immediately before the AD converter 201. Further, a digital-analog (DA) converter 1402 for converting a digital value having passed through the AD converter 201 into an analog value, and feeding back the converted analog value to an analog value from the image sensor 200 is provided. In general, the analog amplifier 1401, the AD converter 201, and the DA converter 1402 in an area surrounded by the dotted line illustrated in FIG. 3B are integrated into one analog front end IC (hereinafter referred to as an AFE) 250. The CPU (control circuit) 301 adjusts a gain setting value of the analog amplifier 1401 so that the analog signal input from the analog amplifier 1401 to the AD converter 201 does not exceed the maximum allowable input range of the AD converter 201. The CPU 301 stores a gain setting value of the analog amplifier 1401 in the RAM 303 serving as a storage device.

(Difference in Data between Color Mode and Monochrome Mode)

Figure 4:
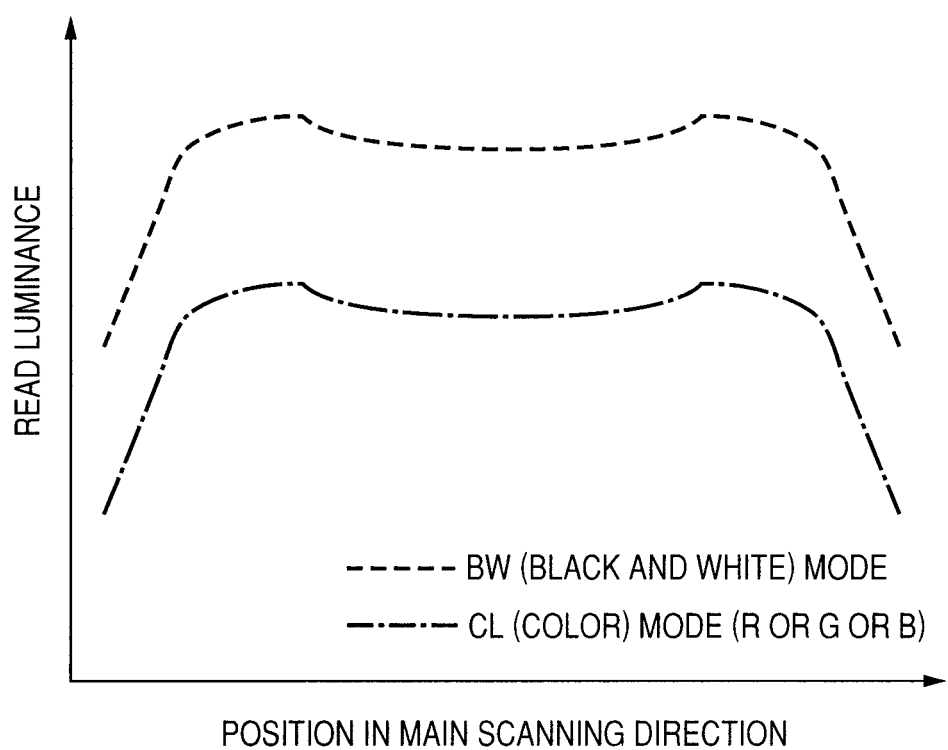
FIG. 4 is a graph illustrating a read luminance with respect to a position in a main scanning direction in a case where a light intensity of a light source and a gain of an analog amplifier are the same between a color mode and a monochrome mode.

FIG. 4 is a graph illustrating a read luminance with respect to a position in the main scanning direction in the case where a light intensity of the light source 103 and a gain setting value of the analog amplifier 1401 remain the same between the color mode and the monochrome mode. In FIG. 4, an abscissa axis indicates a position in a main scanning direction of the line sensors, and an ordinate axis indicates a read luminance. Light-receiving portions of the R, G, B line sensors for a color mode of the image sensor 200 are coated with color filters. Therefore, if the same gain setting value as that of the Bk line sensor for a monochrome mode is applied, a difference occurs in absolute values of light distribution in the main scanning direction. In other words, even when a light intensity from the light source 103 is the same, a difference occurs in absolute values of data to be read between the color mode and the monochrome mode by the degradation in sensitivity of the color filters.

The "difference" occurs only in magnitude (in the ordinate axis direction) of the read luminance. Regarding the light distribution ("distribution" of an amount of received light in the main scanning direction in the image sensor 200), a luminance distribution pattern is the same as long as an optical system is the same. The same optical system refers to, for example, an optical system as the image reading module 102 illustrated in FIG. 1B in which the light source 103, the image sensor 200, and the mirror 105 are integrated. Alternatively, the same optical system may be an optical system in which the image sensor 200 and a lens unit (not shown) are fixed at predetermined positions in the sub-scanning direction, and only the light source 103 and a mirror unit (not shown) can be scanned in the sub-scanning direction.

In this embodiment, using the above-mentioned characteristics, a setting value of the monochrome sensor is obtained on the basis of a setting ratio between the color sensor and the monochrome sensor and the setting value after the adjustment of the color sensor, without adjusting the monochrome sensor.

Figure 5B:
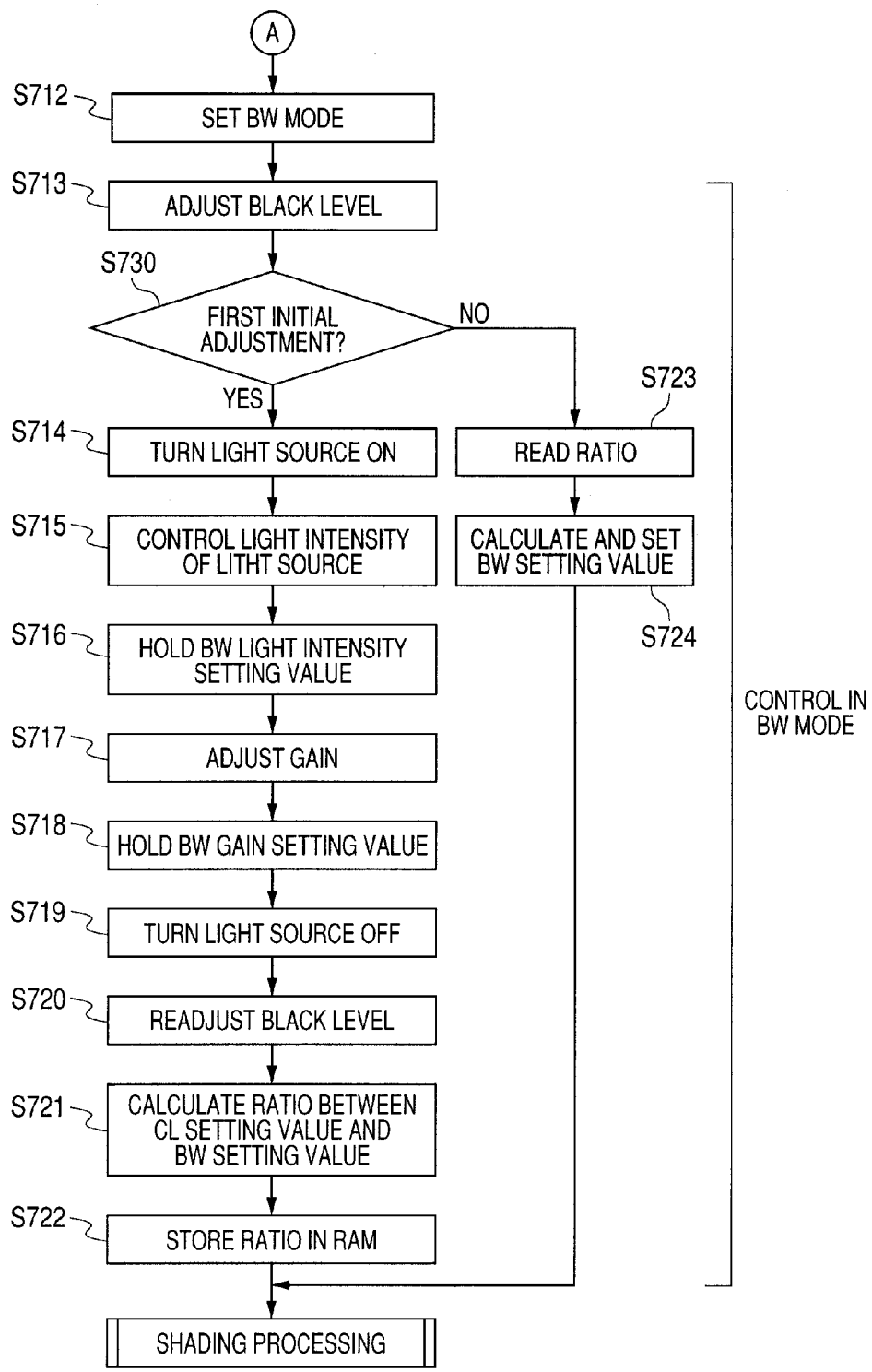
FIG. 5 is comprised of FIGS. 5A and 5B showing flow charts illustrating an example of an initial adjustment control flow of the image reading apparatus according to Embodiment 1.

FIGS. 5A and 5B are flow charts illustrating an example of an initial adjustment control flow of the image reading apparatus of Embodiment 1. In the initial adjustment on an "initial start-up" of the image reading apparatus 10, the CPU 301 calculates a ratio between a light intensity setting value (current setting value) of the color mode adjusted in S706 and a light intensity setting value (current setting value) of the monochrome mode adjusted in S715 (S721). The result of the calculation is stored in the RAM 303 serving as the storage device (S722). Similarly, the CPU 301 calculates a ratio between a gain setting value of the color mode adjusted in S708 and a gain setting value of the monochrome mode adjusted in S717 (S721). The result of the calculation is stored in the RAM 303 (S722).

The adjustment of the light intensity setting value and the gain setting value based on an image signal from the color sensor is performed at each application of power for the second and ensuing times when a user uses the image reading apparatus 10 and/or at each return from a sleep mode (S730). However, the light intensity setting value and the gain setting value are not subjected to adjustment based on the image signal from the monochrome sensor. On an application of power for the second and ensuing times and/or at return from a sleep mode, a light intensity setting value of the monochrome sensor is obtained by calculation based on the "ratio" in a light intensity setting value between the color sensor and the monochrome sensor stored in the RAM 303 and the light intensity setting value adjusted for the color sensor (S724). Further, a gain setting value of the monochrome sensor is obtained by calculation based on a "ratio" in a gain setting value between the color sensor and the monochrome sensor stored in the RAM 303 and the gain setting value adjusted for the color sensor (S724).

(Initial Adjustment)

Figure 6:
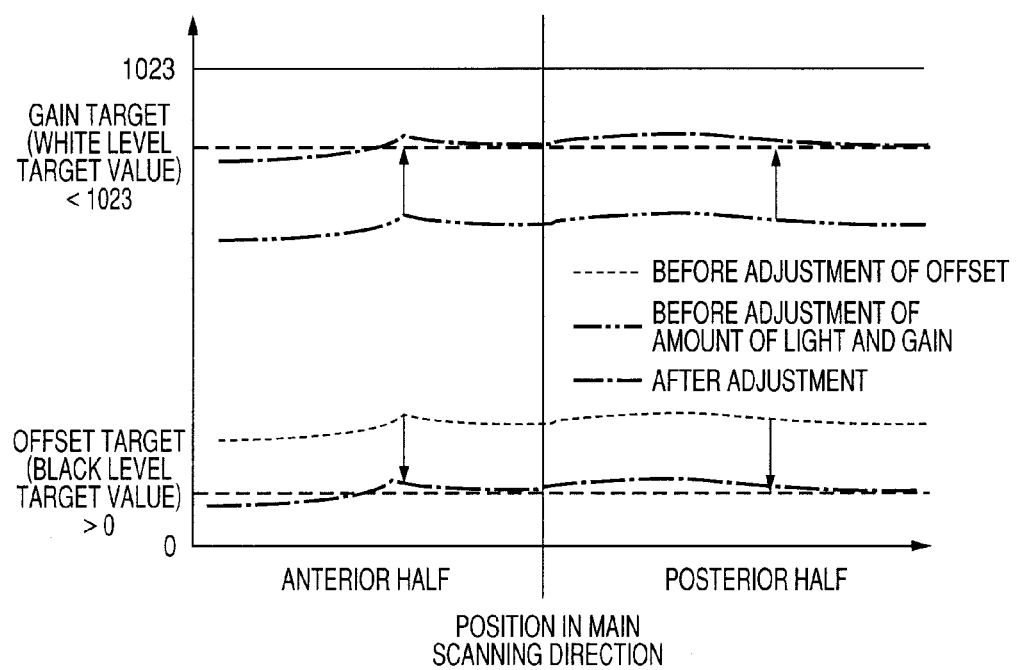
FIG. 6 is an explanatory diagram of a light intensity, gain, and offset adjustment.

Referring to FIGS. 5A, 5B and 6, the control of the initial adjustment of the image reading apparatus according to Embodiment 1 will be described. FIG. 6 is an explanatory diagram of the adjustments of a light intensity, a gain, and an offset. In general, at a timing of an application of power or at a timing of return from a sleep mode of the image reading apparatus 10, it is necessary to determine an input dynamic range (light and dark range) of the AD converter 201. In the case where an analog signal from the analog amplifier 1401 is adjusted so as to be input fully up to the maximum allowable input range of the AD converter 201, the luminance reproducibility of an image that is converted from analog data into digital data become high. In the four-line image sensor 200 illustrated in FIGS. 2A and 2B, the line sensor used in the color mode (CL mode) is different from the line sensor used in the monochrome mode (black and white mode, BW mode). Therefore, it is necessary to determine an input dynamic range of the AD converter 201 independently for each mode.

First, the control of the initial adjustment on the "initial start-up" of the image reading apparatus 10 will be described. Next, the control of the initial adjustment on an application of power for the second and ensuing times or at a time of return from a sleep mode will be described.

(Initial Adjustment on Initial Start-up)

Here, the "initial start-up" of the image reading apparatus 10 in the present specification refers to "a start-up in a step different from that used generally by the user, for example, an adjustment step of an apparatus before shipping from a factory, or a start-up in a step of performing an initial adjustment with an apparatus being set in a user environment".

In S701 of FIGS. 5A and 5B, the CPU 301 moves the image reading module 102 just below the white plate 100 (a home position). In S702, in order to drive the image reading apparatus 10 in the color mode, various settings (CL mode settings) of the image sensor 200 are made. In S703, the image sensor 200 is turned on.

Hereinafter, referring to S704 to S711, the initial adjustment (CL mode control) in the color mode will be described. In S704, a black reference (hereinafter referred to as a black level) is adjusted (offset adjustment). While the light source 103 is turned off and the image sensor 200 is turned on, image data is sampled. The sampled data is stored in the line memories 202. At this time, the gain setting value of the analog amplifier 1401 is one time. Further, a provisional black level value is set in a register (not shown) in the AFE 250. The AD converter 201 converts an analog signal from the image sensor 200 into a digital signal based on the black level setting value and stores the digital signal in the line memories 202 as image data. The CPU 301 rewrites the black level setting value set in the register (not shown) in the AFE 250 so that the minimum value of the data stored in the line memories 202 gets close to an offset target (a target value for the black level). The DA converter 1402 of FIG. 3B converts the digital signal into an analog signal based on the black level setting value. The above-mentioned processing is iterated, so that the difference between the set black level setting value and the sampled data falls within a predetermined range, to thereby complete the adjustment of the black level. In FIG. 6, the image sensor 200 is divided into a first half and a second half in the main scanning direction, and the first half and the second half are adjusted respectively. However, this is according to the specification of an input channel of the AD converter 201. Thus, depending on the specification, both the first half and the second half may be adjusted at a time. In S705, the light source 103 is turned on. In S706, image data is sampled by the light source 103 being turned on and the image sensor 200 being turned on. The sampled data is stored in the line memories 202. At this time, the gain setting value of the analog amplifier 1401 in the front stage of the AD converter 201 is one time. The illumination drive circuits 300 are controlled by the feedback from the CPU 301 so that the maximum value of the stored data gets close to a gain target (a target value for a white level before the shading correction), to thereby determine a current setting value of the light source 103. Here, the light source 103 is an LED. FIG. 6 illustrates the control in which a current value is increased gradually starting from the minimum current value. However, in the case where the light source 103 is designed so that a light intensity is not saturated optically even if the current value of the light source 103 is maximized, the control may be performed in which the current value may be decreased gradually starting from the maximum current value of the light source 103. On the other hand, in a light source (a rare gas phosphor lamp, etc.) having no light amount adjustment function, the steps of S706 and S707 are omitted. In S707, the CPU 301 stores the light intensity setting value set in S706 in a memory in the CPU 301.

S708 is a step to be performed in a case where the gain target is not achieved even if the light intensity of the light source 103 is maximized (even if the current value is set at the maximum value) in S706 or a case of employing a light source (Xe lamp, etc.) that cannot adjust a light intensity. The white plate 100 is illuminated by the light source 103, and the outputs of the R, G, and B line sensors 210 having received reflected light are amplified by the analog amplifier 1401. The CPU 301 adjusts a gain of the analog amplifier 1401 in the front stage of the AD converter 201 so that the amplified signal is input fully up to the maximum allowable input range of the AD converter 201. The gain of the analog amplifier 1401 is set at a value larger than one time (>one time) by the feedback from the CPU 301 and adjusted so that the maximum value of the stored data gets close to the gain target. When the gain is increased, a noise component contained in a signal before being input to the analog amplifier 1401 is also enlarged simultaneously. Thus, in the case of a light source (LED, etc.) capable of adjusting a light intensity, it is desired that the maximum value of the stored data is brought close to the gain target only with the current value of the light source 103, that is, the adjustment of a light intensity, as much as possible.

In S709, the CPU 301 holds the gain setting value set in S708 in the memory of the CPU 301. In S710, the light source 103 is turned off. In S711, the black level is readjusted. The readjustment of the black level in S711 is different from the adjustment of the black level in S704 in that the gain setting value larger than one time may be set in S708. In the case where the gain setting value is larger than one time, the black level setting value adjusted in S704 becomes relatively larger, and hence, it is necessary to readjust the black level setting value. Further, when the AFE 250 is influenced by heat in the processing, the black level setting value may be relatively large. Thus, the readjustment of the black level in S711 also means the readjustment of a change in the black level setting value. In the manner as described above, the initial adjustment (S704 to S711) in the color mode is completed.

Next, in S712, in order to drive the image reading apparatus 10 in the monochrome mode, various settings such as the setting of a sensor register of the image sensor 200 and clock (CLK) switching are made. Hereinafter, referring to S713 to S722, the initial adjustment (BW mode control) in the monochrome mode will be described. In S713, the same adjustment of a black level as that in S704 is performed. In S730, it is determined whether or not the initial adjustment is an initial adjustment on the "initial start-up". The initial adjustment in this case is the initial adjustment on the "initial start-up", and hence, the process proceeds to S714 in which the light source 103 is turned off. In S715, the light intensity setting value of the light source 103 is determined in the same way as in S706. In S716, the CPU 301 holds the light intensity setting value set in S715 in a memory in the CPU 301. In this embodiment, the light source 103 is an LED. However, in the case where the light source is a rare gas phosphor lamp having no light amount adjustment function, S715 and S716 are omitted. S717 is gain setting, similar to S708, which is performed in the case where it is necessary to set the gain of the analog amplifier 1401 to be larger than one time. If required, the gain setting value is set in S717. The white plate 100 is illuminated by the light source 103, and the output of the Bk line sensor 220 having received the reflected light is amplified by the analog amplifier 1401. The CPU 301 adjusts the gain of the analog amplifier 1401 in the front stage of the AD converter 201 so that the amplified signal is input fully up to the maximum allowable input range of the AD converter 201. In S718, the CPU 301 holds the gain setting value set in S717 in a memory of the CPU 301. In S719, the light source 103 is turned off. In S720, the black level is readjusted in the same way as in S711. In S721, the CPU 301 calculates the ratio between the light intensity setting value (current setting value) set in S706 of the color mode and the light intensity setting value (current setting value) set in S715 of the monochrome mode. Further, the CPU 301 calculates the ratio between the gain setting value set in S708 of the color mode and the gain setting value set in S717 of the monochrome mode.

The ratio of the gain setting value is obtained from the gain setting value of any one of the R, G, B line sensors and the gain setting value of the Bk line sensor. The color sensor to be compared with the Bk line sensor may be any one of the R, G, and B line sensors. However, it is preferred to obtain the ratio between the gain setting value of the G line sensor, of which spectral sensitivity is closest to that of the Bk line sensor, and the gain setting value of the Bk line sensor. The reason for this is that a rate of change of a spectral sensitivity according to an angle of view in the main scanning direction slightly varies depending upon the R, G, and B line sensors, and regarding a profile of the read luminance with respect to the main scanning position, the G line sensor is closest to the Bk line sensor.

In S722, the CPU 301 stores the ratio of the light intensity setting values and the ratio of the gain setting values calculated in S721 in the RAM 303. In the manner as described above, the initial adjustment (S713 to S722) in the monochrome mode is completed. After the completion of the initial adjustment of the monochrome mode is completed, the shading processing is performed.

(Initial Adjustment on an Application of Power for the Second Time and Ensuing Times or at a Time of Return from Sleep Mode)

According to Embodiment 1, the initial adjustment (S714 to S722) is omitted on an application of power for the second and ensuing times or at a time of return from a sleep mode. Hereinafter, the initial adjustment on an application of power for the second and ensuing times or at a time of return from a sleep mode will be described with reference to FIG. 5.

When an image sensor is turned on (S703) in the color mode (S702), the initial setting of the color mode (S704 to S711) is performed in the same way as in the initial setting on the "first start-up". In S706, the white plate 100 is illuminated by the light source 103, and the outputs of the R, G, and B line sensors 210 having received reflected light are converted by the AD converter 201 and stored in the line memories 202 as image data. The current setting value (the light intensity setting value) of the light source 103 is adjusted by controlling the illumination drive circuits 300 by the feedback from the CPU 301 so that the maximum value of the stored data gets close to the gain target. The light intensity setting value is held in a memory in the CPU 301. Further, in the case where it is necessary to adjust the gain, the white plate 100 is illuminated by the light source 103 in S708, and the outputs of the R, G, and B line sensors 210 having received the reflected light are amplified by the analog amplifier 1401. The CPU 301 adjusts the gain of the analog amplifier 1401 so that the amplified signal is input fully up to the maximum allowable input range of the AD converter 201. The gain setting value is held in a memory in the CPU 301.

Then, after the black level adjustment (S713) is performed in the monochrome mode (S712), it is determined in S730 whether or not the initial adjustment is an initial adjustment on the "initial start-up". This initial adjustment is not the initial adjustment on the "initial start-up", and hence, the process proceeds to S723.

In S723, the CPU 301 reads the ratio of the light intensity setting values and the ratio of gain setting values, from the RAM 303. In S724, the light intensity setting value of the color mode held in the CPU 301 in S707 on an application of power for the second and ensuing times or at a time of return from a sleep is multiplied by the ratio of the light intensity setting value read from the RAM 303. The calculation result is set as a light intensity setting value of the monochrome mode. Similarly, the gain setting value (in this embodiment, the gain setting value of the G line sensor) of the color mode held in the CPU 301 in S709 is multiplied by the ratio of the gain setting values read from the RAM 303. The calculation result is set as a gain setting value of the monochrome mode.

Accordingly, in the monochrome mode, the light intensity setting value and/or the gain setting value are obtained by calculation. Thus, the initial adjustment time for the second and ensuing times can be reduced to substantially a half of the conventional initial adjustment time.

According to this embodiment, the gain setting value and/or the light intensity setting value of the monochrome sensor are calculated based on the gain setting value and/or the light intensity setting value of the color sensor. Therefore, the time it takes to adjust a light intensity and/or a gain after an application of power can be shortened. This enables the time it takes to start the initial read operation to be shortened.

According to this embodiment, a time it takes up to start the initial read operation of the image reading apparatus can be shortened.

Further, according to this embodiment, the time it takes to perform the initial adjustment of the image reading apparatus can be shortened.

Further, in this embodiment, the adjustment of the color mode is performed for each initial adjustment (offset gain adjustment) of the image reading apparatus, to thereby attain a sequence capable of alleviating the time degradation of the light source.

In this embodiment, the ratio of the gain setting values and/or the light intensity setting values of the color mode and the monochrome mode is calculated on the "initial start-up". However, the present invention is not limited thereto. The ratio may be calculated and stored in the RAM 303 for each predetermined period of time. Examples of the predetermined period of time include a predetermined time having elapsed from a time when the ratio is calculated previously or a predetermined number of main scans for reading an image. For example, the ratio of the setting values of the color mode and the monochrome mode may be readjusted by performing the adjustment in the steps of S714 to S722 of FIG. 5B for each predetermined period of time (a number of times or an amount of time), considering the degradation in the image sensor itself. More specifically, in Embodiment 1, it is determined whether or not the initial adjustment is the first initial adjustment (the adjustment on the initial start-up) in the step of S730 of FIG. 5B. However, the present invention is not limited thereto. It may be determined in the step of S730 whether or not a predetermined period of time (a number of times or an amount of time) has elapsed. Every time a predetermined period of time (a number of times or an amount of time) has elapsed, the adjustment in the steps of S714 to S722 is performed, and thus, the ratio of the setting values of the color mode and the monochrome mode is readjusted. This enables the initial adjustment to be performed, considering the degradation in the image sensor itself. The predetermined period of time may be set to an amount of time from a time of the previous calculation of a ratio of setting values of the color mode and the monochrome mode to a time when a predetermined time has elapsed from the time of the previous calculation. Further, the predetermined period of time may be a predetermined number of scans for reading an image.

[Embodiment 2]

Figure 7B:
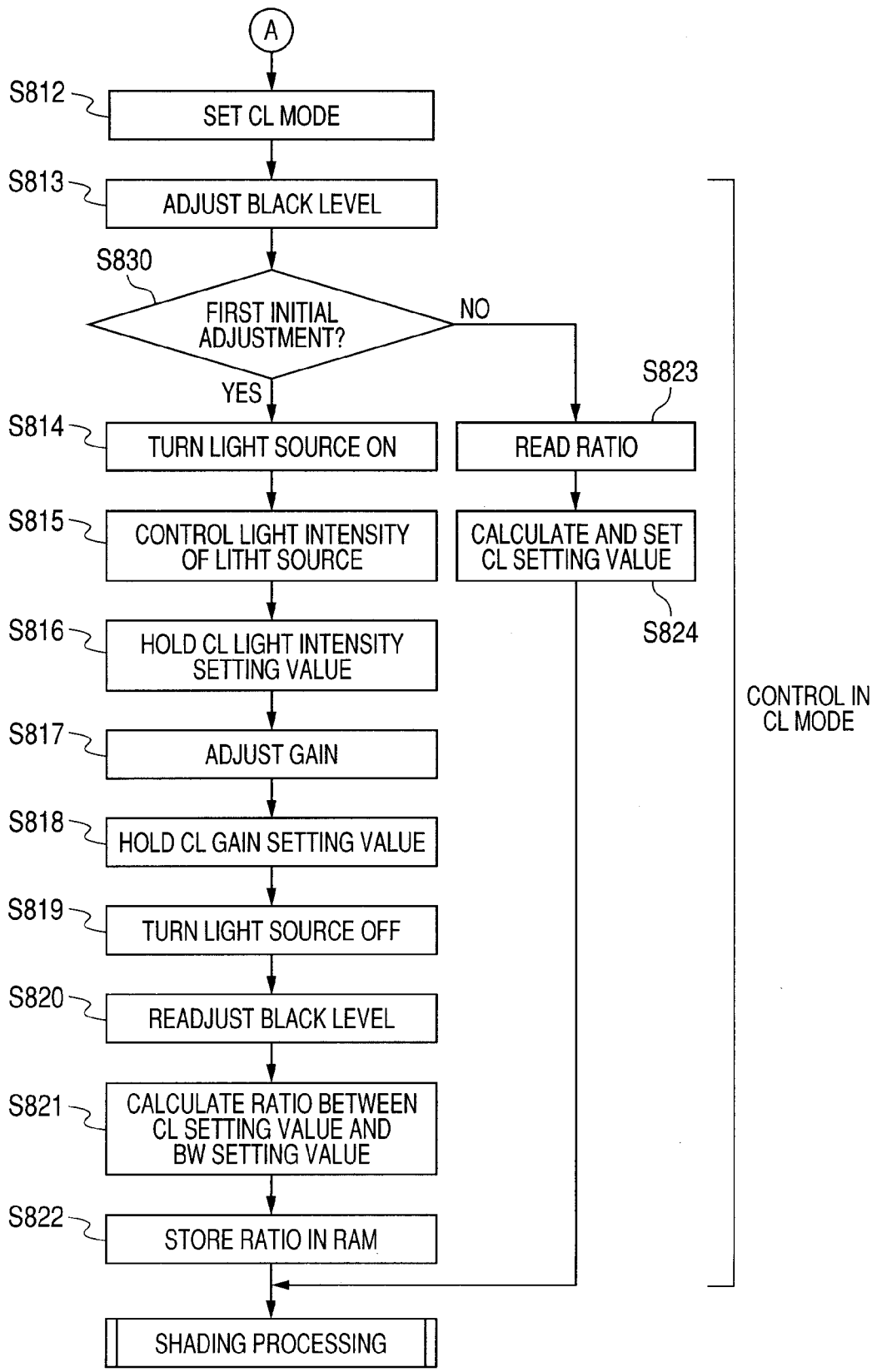
FIG. 7 is comprised of FIGS. 7A and 7B showing flow charts illustrating an example of an initial adjustment control flow of an image reading apparatus according to Embodiment 2 of the present invention.

Hereinafter, an image reading apparatus according to Embodiment 2 will be described with reference to FIGS. 7A and 7B. The image reading apparatus of Embodiment 2 has the same configuration as that of the image reading apparatus of Embodiment 1, except for the flow of the initial adjustment control. Description of the same configuration as that of Embodiment 1 is omitted.

In Embodiment 1, in the color mode, an analog gain setting value and/or a light intensity setting value was adjusted in the color mode. The analog gain setting value and/or the light intensity setting value of the monochrome mode was obtained by calculation, based on the analog gain setting value and/or the light intensity setting value adjusted in the color mode. In Embodiment 2, the analog gain setting value and/or the light intensity setting value is adjusted in the monochrome mode. The analog gain setting value and/or the light intensity setting value in the color mode is obtained by calculation, based on the analog gain setting value and/or the light intensity setting value adjusted in the monochrome mode.

(Initial Adjustment on Initial Start-up)

FIG. 7 is a diagram illustrating an example of an initial adjustment control flow of the image reading apparatus of Embodiment 2.

In S801 of FIG. 7A, the CPU 301 moves the image reading module 102 just below the white plate 100 (home position). In S802, in order to drive the image reading apparatus 10 in the monochrome mode, various settings (BW mode setting) of the image sensor 200 are made. In S803, the power source of the image sensor 200 is turned on.

Hereinafter, referring to S804 to S811, the initial adjustment (BW mode control) in the monochrome mode will be described. In S804, a black level is adjusted in the same way as in S704 of FIG. 5A in Embodiment 1. In S805, the light source 103 is turned on. In S806, image data is sampled by the light source 103 being turned on and the image sensor 200 being turned on. The sampled data is stored in the line memories 202. At this time, the gain setting value of the analog amplifier 1401 is one time. The illumination drive circuits 300 are controlled by the feedback from the CPU 301 so that the maximum value of the stored data gets close to a gain target (a target value of a white level before the shading correction), to thereby determine a current setting value of the light source 103. In S807, the CPU 301 holds the light intensity setting value set in S806 in a memory in the CPU 301. S808 is a step to be performed in a case where the gain target is not achieved even if the light intensity of the light source 103 is maximized in S806 or a case of employing a light source (a Xe lamp, etc.) that cannot adjust a light intensity. The white plate 100 is illuminated by the light source 103, and the output of the Bk line sensor 220 having received reflected light is amplified by the analog amplifier 1401. The CPU 301 adjusts a gain of the analog amplifier 1401 so that the amplified signal is input fully up to the maximum allowable input range of the AD converter 201. The gain of the analog amplifier 1401 is set at a value larger than one time (>one time) by the feedback from the CPU 301 and adjusted so that the maximum value of the stored data gets close to the gain target. In S809, the CPU 301 holds the gain setting value set in S808 in a memory of the CPU 301. In S810, the light source 103 is turned off. In S811, a black level is readjusted. In the manner as described above, the initial adjustment (S804 to S811) in the monochrome mode is completed.

Next, in S812, in order to drive the image reading apparatus 10 in the color mode, various settings such as the setting of a sensor register of the image sensor 200 and CLK switching are made. Hereinafter, referring to S813 to S822, the initial adjustment (CL mode control) in the color mode will be described. In S813, the same adjustment of a black level as that in S804 is performed. In S830, it is determined whether or not the initial adjustment is an initial adjustment on the "initial start-up". This initial adjustment is the initial adjustment on the "initial start-up", and hence, the process proceeds to S814 in which the light source 103 is turned on. In S815, the light intensity setting value of the light source 103 is determined in the same way as in S806. In S816, the CPU 301 holds the light intensity setting value set in S815 in a memory in the CPU 301. In this embodiment, the light source 103 is an LED. However, in a case where the light source is a rare gas phosphor lamp having no light amount adjustment function, S815 and S816 are omitted. S817 is gain setting, similar to S808, which is performed in the case where it is necessary to set the gain of the analog amplifier 1401 to be larger than one time. The white plate 100 is illuminated by the light source 103, and the outputs of the R, G, and B line sensors 210 having received the reflected light are amplified by the analog amplifier 1401. The CPU 301 adjusts the gain of the analog amplifier 1401 in the front stage of the AD converter 201 so that the amplified signals are input fully up to the maximum allowable input range of the AD converter 201. Regarding the respective analog amplifiers of R, G, and B, an R gain setting value, a G gain setting value, and a B gain setting value are adjusted while the white plate 100 is being illuminated by the light source 103. In S818, the CPU 301 holds the R, G, and B gain setting values set in S817 in a memory of the CPU 301. In S819, the light source 103 is turned off. In S820, the black level is readjusted in the same way as in S811. In S821, the CPU 301 calculates a ratio between the light intensity setting value (the current setting value) of the monochrome mode held in S807 and the light intensity setting value (the current setting value) of the color mode held in S816. Further, the CPU 301 calculates a ratio between the gain setting value of the monochrome mode held in S809 and the R, G, and B gain setting values of the color mode held in S818. More specifically, the CPU 301 calculates an R gain setting value/Bk gain setting value, a G gain setting value/Bk gain setting value, and a B gain setting value/Bk gain setting value.

In S822, the CPU 301 stores, in the RAM 303 as a storage device, the ratio of the light intensity setting values and the ratio of the gain setting values calculated in S821. In the manner as described above, the initial adjustment (S813 to S822) in the color mode is completed. After the completion of the initial adjustment of the color mode is completed, the shading processing is performed.

(Initial Adjustment on an Application of Power for the Second and Ensuing Times or at a Time of Return from Sleep Mode)

According to Embodiment 2, the initial adjustment (S814 to S822) is omitted on an application of power for the second and ensuing times or at a time of return from a sleep mode. Hereinafter, the initial adjustment on an application of power for the second and ensuing times or at a time of return from a sleep mode is described with reference to FIGS. 7A and 7B.

When an image sensor is turned on (S803) in the monochrome mode (S802), the initial setting of the monochrome mode (S804 to S811) is performed in the same way as in the initial setting on the "first start-up". In S806, the white plate 100 is illuminated by the light source 103, and the output of the Bk line sensor 220 having received reflected light is converted by the AD converter 201 and stored in the line memories 202 as image data. The current setting value (the light intensity setting value) of the light source 103 is adjusted by controlling the illumination drive circuits 300 by the feedback from the CPU 301 so that the maximum value of the stored data gets close to the gain target. The light intensity setting value is held in a memory in the CPU 301. Further, in the case where it is necessary to adjust the gain, the white plate 100 is illuminated by the light source 103 in S808, and the output of the Bk line sensor 220 having received the reflected light is amplified by the analog amplifier 1401. The CPU 301 adjusts the gain of the analog amplifier 1401 so that the amplified signal is input fully up to the maximum allowable input range of the AD converter 201. The gain setting value is held in a memory in the CPU 301.

Then, after the black level adjustment (S813) is performed in the color mode (S812), it is determined whether or not the initial adjustment is an initial adjustment on the "initial start-up" in S830. This initial adjustment is not the initial adjustment on the "initial start-up", and hence, the process proceeds to S823.

In S823, the CPU 301 reads the ratio of the light intensity setting values and the ratio of gain setting values, from the RAM 303. The ratio of gain setting values is obtained as the R gain setting value/Bk gain setting value, the G gain setting value/Bk gain setting value, and the B gain setting value/Bk gain setting value. In S824, the light intensity setting value of the monochrome mode held in the CPU 301 in S807 on start-up for the second and ensuing times or at a time of return from a sleep is multiplied by the ratio of the light intensity setting values read from the RAM 303. The calculation result is set as a light intensity setting value of the color mode. Similarly, the gain setting value of the Bk line sensor of the monochrome mode held in the CPU 301 in S809 is multiplied by the ratio of the gain setting values read from the RAM 303. More specifically, the Bk gain setting value is multiplied by the R gain setting value/Bk gain setting value, the G gain setting value/Bk gain setting value, and the B gain setting value/Bk gain setting value, respectively. The calculation results are set as an R gain setting value, a G gain setting value, and a B gain setting value of the color mode.

Accordingly, in the color mode, the light intensity setting value and/or the gain setting value are obtained by the calculation. Thus, the initial adjustment time for the second and ensuing times can be reduced to substantially a half of the conventional initial adjustment time.

According to this embodiment, the gain setting value and/or a light intensity setting value of the color sensor are calculated based on the gain setting value and/or the light intensity setting value of the monochrome sensor. Therefore, the time it takes to adjust a light intensity and/or a gain after an application of power can be shortened. This enables the time it takes to start the initial read operation to be shortened.

[Embodiment 3]

Hereinafter, referring to FIGS. 8 to 12, an image reading apparatus according to Embodiment 3 will be described. The image reading apparatus of Embodiment 3 has the same configuration as that of the image reading apparatus 10 of Embodiment 1 illustrated in FIGS. 1A and 1B, except for the image sensor. Description of the same configuration as that of Embodiment 1 is omitted.

(Image Sensor)

Figure 8:
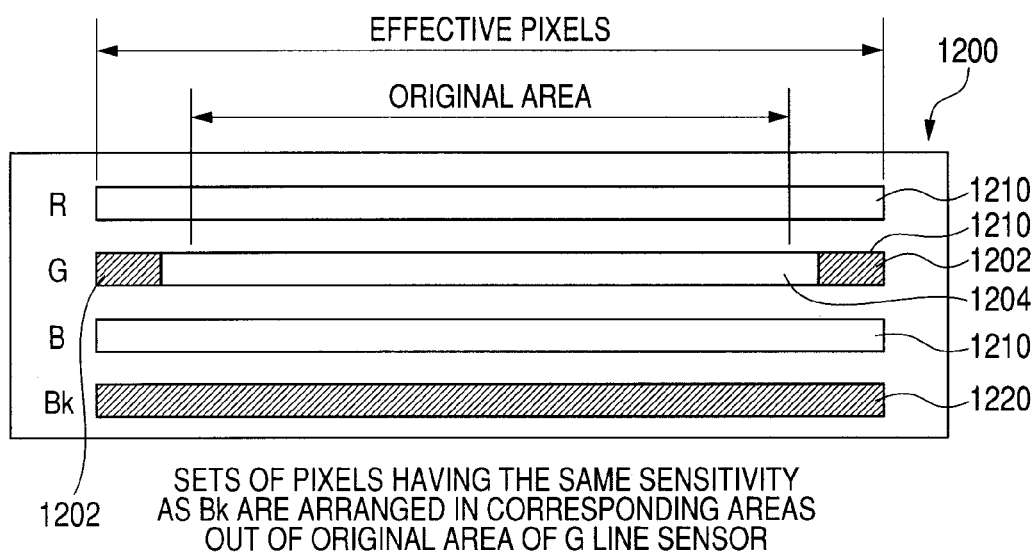
FIG. 8 is a schematic diagram of an image sensor according to Embodiment 3 of the present invention.

FIG. 8 is a schematic diagram of an image sensor 1200 according to Embodiment 3. The image sensor 1200 includes an R line sensor, a G line sensor, and a B line sensor, which constitute a color sensor 1210, and a Bk line sensor, which constitutes a monochrome sensor 1220. As is apparent from FIG. 1A, generally, considering the mechanical tolerance, the dimension of the image reading module 102 is designed previously so as to read a range slightly larger than that of the original area 101. The original area 101 is an area where an image of an original can be read. The image sensor 1200 incorporated in the image reading module 102 can read a range larger than a length of 297 mm in the main scanning direction of the original area 101. The number of effective pixels of the R, G, B, and Bk line sensors is set so as to be larger than the number of pixels of the length of the original area 101.

In the image sensor 1200 illustrated in FIG. 8, a group of pixels 1202 in portions corresponding to the outside of the original area in terms of design, among the effective pixels of the G line sensor, are not coated with a color filter similarly to the Bk line sensor. Such a G line sensor can be produced by masking the group of pixels 1202 in both end portions while coating the group of pixels 1204 with a color filter. In the case where the Bk line sensor is coated with a light green color filter, the group of pixels 1202 in both end portions may be coated with a light green color filter in the same way as in the Bk line sensor. In Embodiment 3, the groups of pixels 1202 having the same sensitivity as that of the Bk line sensor are provided in both end portions of the G line sensor.

However, the present invention is not limited to the G line sensor. The group of pixels in a portion corresponding to the outside of the original area in terms of design, among the effective pixels of any one line sensor of the R, G, and B line sensors, may have the same sensitivity as that of the Bk line sensor.

The spectral sensitivity of the Bk line sensor, however, is most similar to that of the G line sensor among the R, G, and B line sensors, and hence, it is desired that the Bk line sensor is provided in an end portion of the G line sensor.

(Profile of Read Data of White Plate)

Figure 9:
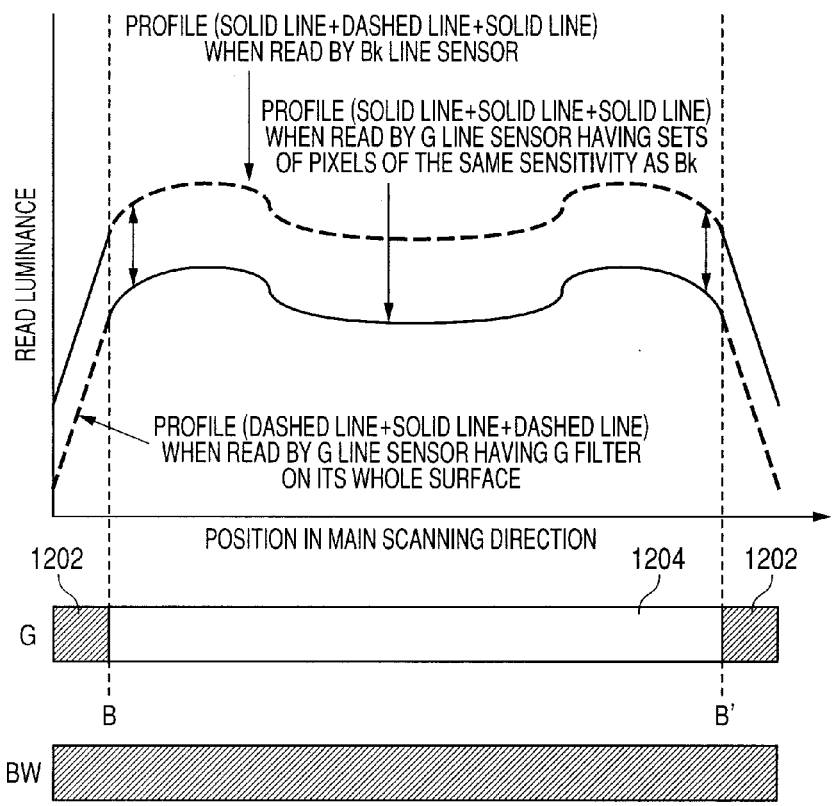
FIG. 9 is a diagram illustrating a profile of data of a white plate sampled by the image sensor according to Embodiment 3.

FIG. 9 is a diagram illustrating a profile of data of the white plate 100 sampled by the image sensor 1200 illustrated in FIG. 8. An ordinate axis indicates a read luminance. An abscissa axis indicates a main scanning position. As described with reference to FIG. 4, if the gain setting value and the light intensity setting value remain the same between the color mode and the monochrome mode, only an absolute value (a magnitude of a read luminance) changes with the light distribution pattern in the main scanning direction remaining the same. As illustrated in FIG. 9, in the case where the white plate 100 is read by the Bk line sensor, the light distribution pattern exhibits a profile obtained by connecting a solid line, a dotted line, and a solid line starting from the left in FIG. 9. In the case where the white plate 100 is read by the G line sensor coated with the G filter over its entire surface, the light distribution pattern exhibits a profile obtained by connecting a dotted line, a solid line, and a dotted line starting from the left in FIG. 9. In the case where the white plate 100 is read by the G line sensor having the groups of pixels 1202 having the same sensitivity as that of the Bk line sensor outside of the original area according to Embodiment 3, the light distribution pattern exhibits a profile obtained by connecting a solid line, a solid line, and a solid line starting from the left in FIG. 9.

As illustrated in FIGS. 1A and 1B, the white plate 100 is larger than the original area 101 in length in the main scanning direction. Thus, even in the groups of pixels 1202 outside of the original area 101 as illustrated in FIG. 9, a profile which does not disturb the light distribution may be obtained when the white plate 100 is read in an original light amount adjustment or a gain adjustment.

(Calculation of Ratio of Read Data between Bk Sensor Portion and G Sensor Portion)

Figure 10:
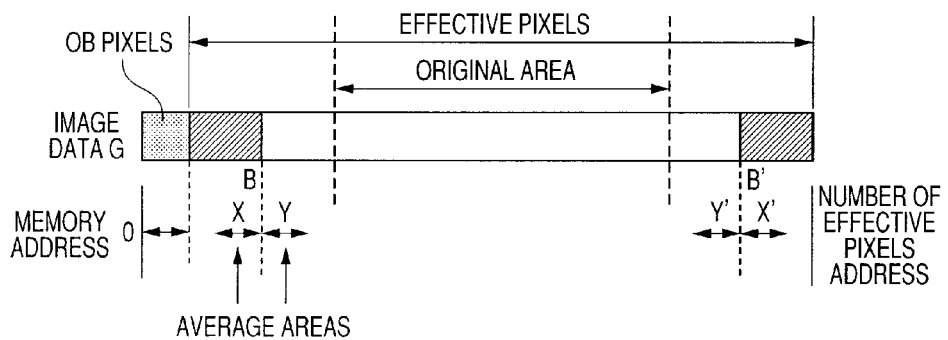
FIG. 10 is an explanatory diagram illustrating how a light intensity setting value and/or a gain setting value in the monochrome mode is calculated based on a light intensity setting value and/or a gain setting value in the color mode in Embodiment 3.

FIG. 10 is an explanatory diagram illustrating how a light intensity setting value and/or a gain setting value of the monochrome mode is calculated, based on the light intensity setting value and/or a gain setting value of the color mode. In the original light amount adjustment or in the gain adjustment, the data of the white plate 100 sampled by the G line sensor of the image sensor 1200 of Embodiment 3 exhibits a profile obtained by connecting a solid line, a solid line, and a solid line starting from the left of FIG. 9. The data is held in the line memory 202 in an arrangement as illustrated in FIG. 10. Hereinafter, the group of pixels 1202 having the same sensitivity as that of the Bk line sensor, in a portion corresponding to the outside of the original area in terms of design, among the effective pixels of the G line sensor, is referred to as a Bk sensor portion (a monochrome sensor portion). Further, the group of pixels 1204 coated with the G filter of the G line sensor is referred to as a G sensor portion (a color sensor portion).

The light intensity setting value and/or the gain setting value of the color mode are determined based on the data of the G sensor portion coated with the G filter of the G line sensor.

In FIG. 9, the read luminance is exaggerated for purposes of illustration. Further, the Bk sensor portion is drawn relatively larger than an actual size. Therefore, the maximum luminance value of the Bk sensor portion appears deceptively to be larger than the maximum luminance value of the G sensor portion. However, actually, light intensitya light intensity is low at the end portion of the G line sensor, in which the Bk sensor portion is placed, and the Bk sensor portion is small, and hence, the maximum luminance value of the Bk sensor portion does not become larger than the maximum luminance value of the G sensor portion. For example, in the case where the number of effective pixels is 7,500, the Bk sensor portion is about 10 pixels. Thus, even in the case of adjusting the light intensity setting value and the gain setting value so that the maximum value of the data of the G line sensor gets close the gain target, the data in the Bk sensor portion does not influence the light intensity and the gain setting value of the G line sensor. In the case where a light intensity of an illumination system is uniform in the main scanning direction or there is a remarkable difference in sensitivity between the G sensor portion and the Bk sensor portion due to a large thickness of the G filter of the G sensor portion, the data in the Bk sensor portion may influence the adjustment of the light intensity and the gain setting value of the G line sensor.

The CPU 301 calculates an average value of an area X that is the data of the Bk sensor portion and an average value of an area Y that is the data of the G sensor portion. Then, the CPU 301 calculates a ratio of the average value of the area X to the average value of the area Y. The ratio of the read data between the Bk sensor portion and the G sensor portion is stored in the RAM 303 serving as a storage device. Here, the average value of data of multiple pixels is obtained because consideration is given to the case where a boundary B becomes gentle in terms of the production of a sensor. It is preferred that the G line sensor having the Bk sensor portion is designed so that the boundary B between the Bk sensor portion and the G sensor portion is clear. However, the boundary B between the Bk sensor portion and the G sensor portion does not become clear, and a transition portion in which the G filter becomes gradually thin from the G sensor portion to the Bk sensor portion may occur. In this case, even when the data of one pixel of the Bk sensor portion in the transition portion is compared with the data of one pixel of the G sensor portion in the transition portion, no difference may appear. In view of this, the ratio is obtained from the average value of the data of multiple pixels in the Bk sensor portion and the average value of the data of multiple pixels in the G sensor portion. However, if the number of pixels for obtaining an average value of the Bk sensor portion is increased too much, data of pixels which does not receives sufficient light from the light source 103 is contained, and hence, the average value decreases extremely. Consequently, an error occurs in the calculation result of the ratio. Thus, it is desired to calculate an average value of multiple pixels as close as possible to the boundary B.

Here, in the case where which pixel of the effective pixels the boundary B corresponds to can be previously specified precisely, the average value of multiple pixels previously determined on the left side of the boundary B and the average value of multiple pixels previously determined on the right side of the boundary B may be calculated. Otherwise, a difference is obtained for each pixel by the CPU 301, a pixel (boundary) in which the difference becomes extremely large is detected, and an average value of multiple pixels in the left and right from the detected pixel may be calculated. In this case, the load on the CPU 301 becomes large, and hence, the calculation of a ratio may be performed for each predetermined period of time, instead of being performed every time, for reducing the burden.

(Calculation of Light intensity Setting Value and/or Gain Setting Value of Monochrome Mode)

The amount of the light setting value and/or the gain setting value of the monochrome mode is obtained by multiplying the light intensity setting value and/or the gain setting value set in the color mode by the ratio (the ratio of read data of the Bk sensor portion to read data of the G sensor portion). Here, the data of the Bk sensor portion 1202 provided in the end portion of the G line sensor is obtained only from a drive frequency of the color mode. Therefore, in an image reading apparatus in which the drive frequency varies between the color mode and the monochrome mode, the setting value may further be multiplied by the ratio of the drive frequency. The ratio of the drive frequency is determined in a design stage, and hence, is stored previously in the RAM 303. The monochrome mode setting value is set according to the following Equation (1).

[Numerical Equation 1]

$$BW \text{ mode setting value} = CL \text{ mode setting value} \times \frac{\text{Average value of area } Y}{\text{Average value of area } X} \times \frac{BW \text{ drive frequency}}{CL \text{ drive frequency}} \quad \text{Equation (1)}$$

(Initial Adjustment)

Figure 11:
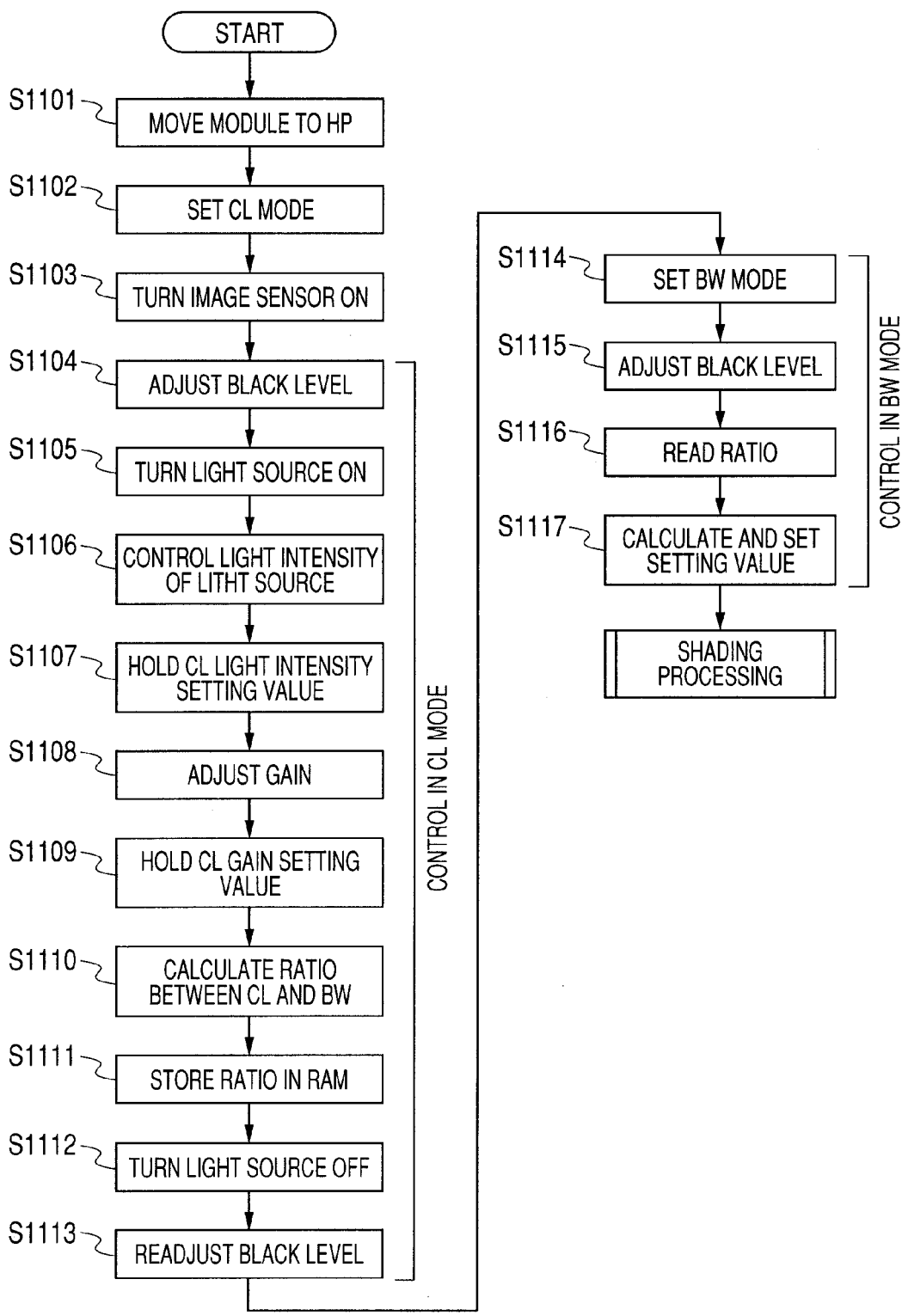
FIG. 11 is a flow chart illustrating an example of an initial adjustment control flow of an image reading apparatus according to Embodiment 3.

FIG. 11 is a flowchart illustrating an example of a flow of initial adjustment control of an image reading apparatus according to Embodiment 3. The CPU 301 is capable of executing a sequence illustrated in FIG. 11, using the image sensor 1200 illustrated in FIG. 8. The difference from the flow in Embodiment 1 illustrated in FIG. 5 resides in that, even in the initial adjustment on the "initial start-up", it is not necessary to perform data sampling for light amount adjustment and/or gain adjustment of the monochrome mode.

Referring to FIG. 11, the steps of S1101 to S1109 are similar to those of S701 to S709 of FIG. 5A, and hence, the repeated description is omitted. S1104 to S1113 correspond to the control (CL mode control) of initial adjustment in the color mode. Here, the data sampled during the light source light amount adjustment in S1106 and the data sampled during the gain adjustment in S1108 are stored in the line memories 202. The light intensity setting value set in S1106 and/or the gain setting value set in S1108 are stored in a memory in the CPU 301 (S1107 and S1109).

Figure 12:
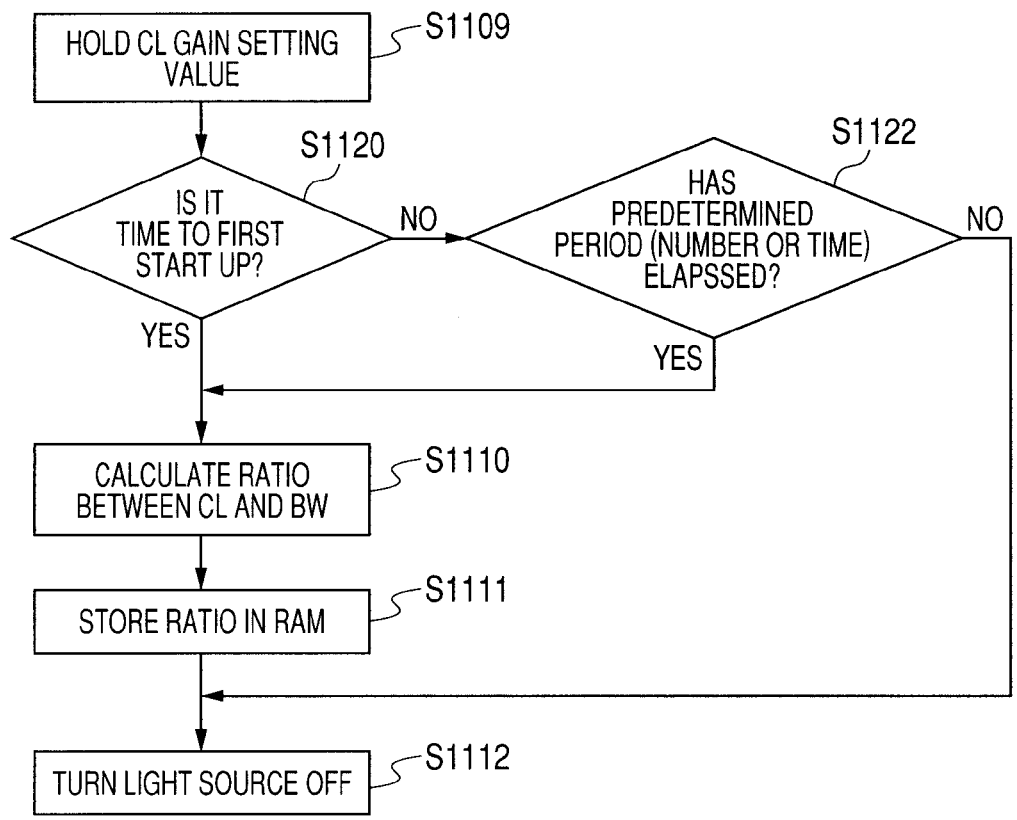
FIG. 12 is a flow chart illustrating a modified embodiment of Embodiment 3.

In S1110, using the data stored in the line memories 202, the ratio between the data read in the Bk sensor portion 1202 and the data read in the G sensor portion 1204 is calculated in the CPU 301. In S1111, the ratio between the Bk sensor portion and the G sensor portion calculated in S1110 is stored in the RAM 303. In the embodiment illustrated in FIG. 11, every time the initial adjustment of the color mode is performed, the ratio between the Bk sensor portion and the G sensor portion is calculated and the calculation result is stored in the RAM 303 (S1110 and S1111). However, according to the present invention, it is not always necessary to calculate the ratio every time the initial adjustment of the color mode is performed. The ratio may be calculated to be stored in the RAM 303 every predetermined period of time. Examples of the predetermined period of time include a predetermined amount of time having elapsed from a time when the ratio is calculated previously or a predetermined number of times of main scans for reading an image. FIG. 12 illustrates a modified embodiment of Embodiment 3. As illustrated in FIG. 12, S1120 may be provided between S1109 and S1110. In S1120, it is determined whether or not the initial adjustment is an initial adjustment on the "initial start-up". If this initial adjustment is the initial adjustment on the "initial start-up", the process proceeds to S1110, and the ratio is calculated. If this initial adjustment is not the initial adjustment on the "initial start-up", and the process proceeds to S1122. In S1122, it is determined whether or not a predetermined period of time (a number of times or an amount of time) has elapsed. When the predetermined period of time (the number of times or the amount of time) has elapsed, the process proceeds to S1110, and the ratio is calculated. On the other hand, when the predetermined period of time (the number of times or the amount of time) has not elapsed, the process proceeds to S1112, in which the light source is turned off. Thus, by calculating the ratio every time the predetermined period of time (the number of times or the amount of time) has elapsed, the burden on the CPU 301 can be reduced.

Referring to FIG. 11, the steps of S1112 to S1115 are similar to those of S710 to S713 of FIGS. 5A and 5B, and hence, the description thereof is omitted. S1114 to S1117 correspond to the control (BW mode control) of the initial adjustment in the monochrome mode. In S1116, the "ratio of read data between the Bk sensor portion and the G sensor portion" stored in the RAM 303 and the "ratio of a drive frequency between the color mode and the monochrome mode" stored in the RAM 303 in the design stage are read. In S1117, by multiplying the light intensity setting value and/or the gain setting value of the color mode held in S1107 and/or S1109 by the ratio read in S1116, the light intensity setting value and/or the gain setting value of the monochrome mode is derived and set.

In the embodiment illustrated in FIG. 11, sampling of data in the monochrome mode can be omitted. However, in order to alleviate an error in ratio due to the time degradation of the sensor, a sequence of performing data sampling for light amount adjustment and/or gain adjustment may be incorporated even in the monochrome mode.

Figure 13:
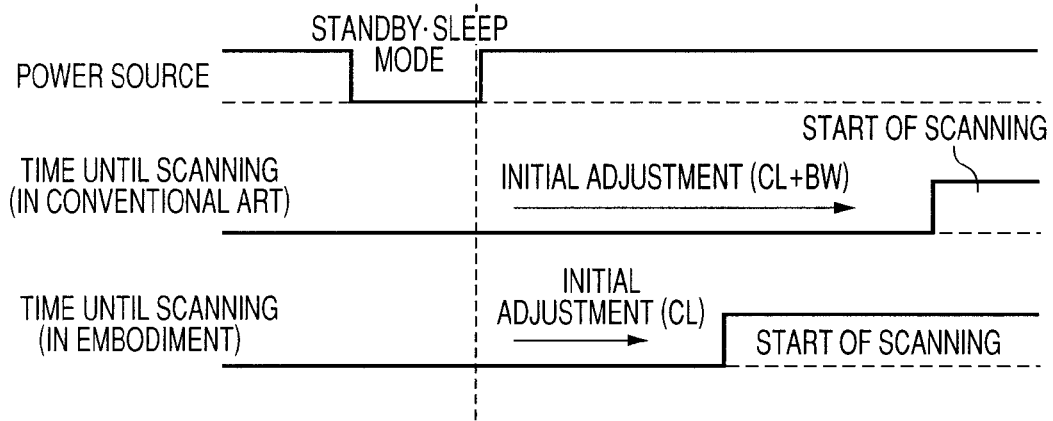
FIG. 13 is a diagram illustrating a length of time before the start of an initial read operation (first scan) of an image reading apparatus.

FIG. 13 is a diagram illustrating a length of time before the start of an initial read operation (first scan) of the image reading apparatus in a time table. In the conventional image reading apparatus, before the start of an initial read operation after return from a standby mode or a sleep mode, a time for executing initial adjustment of the color mode and a time for executing initial adjustment of the monochrome mode are required. In contrast, according to this embodiment, the setting value in the monochrome mode is calculated based on the setting value of the color mode, to thereby omit the initial adjustment of the monochrome mode. In this manner, the sequence of initial adjustment of the image reading apparatus may be shortened to about substantially a half. That is, the time it takes to start first scanning after return from a standby/sleep mode can be shortened.

Generally, a length of time before the start of first scanning is 3 to 4 seconds, depending upon the type and specification of an apparatus. Of those, the initial adjustment time related to the image sensor is less than one second. However, considering that it is necessary to perform other controls and adjustments before the scanning, for example, the reduction of the image sensor adjustment time from one second to 500 milliseconds among 3 to 4 seconds is very effective.

According to this embodiment, the analog gain setting value and/or the light intensity setting value of the monochrome sensor are set based on the analog gain setting value and/or the light intensity setting value of the color sensor. Thus, the time it takes to perform the light amount adjustment and/or the analog gain adjustment after an application of power can be shortened. Further, a length of time before the start of an initial reading operation (first scanning) can be shortened.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-208205, filed Sep. 9, 2009, which is hereby incorporated by reference herein in its entirety.

What is claimed is:

1. An image reading apparatus, comprising:
   a light source constructed to illuminate an original;
   a color sensor and a monochrome sensor constructed to receive light reflected from the original illuminated by the light source to output an image signal, the color sensor being a sensor constructed to output a color image signal, and the monochrome sensor being a sensor constructed to output a monochrome image signal;
   an AD converting portion constructed to convert the color image signal from the color sensor to a digital image signal based on a first black level and to convert the monochrome image signal from the monochrome sensor to a monochrome digital image signal based on a second black level;
   a reference member; and
   a setting portion constructed to:
   set the first black level based on a color digital image signal from the color sensor with the light source turned off;
   set a first light intensity setting value of the light source for reading an image using the color sensor based on a color digital image signal from the color sensor receiving light reflected from the reference member with the light source turned on;
   set the second black level based on a monochrome image digital signal from the monochrome sensor with the light source turned off; and
   calculate a second light intensity setting value of the light source for reading an image using the monochrome sensor from the first light intensity setting value.

2. The image reading apparatus according to claim 1, further comprising an amplifier constructed to amplify the color image signal and to amplify the monochrome image signal,
   wherein the setting portion sets color gain setting condition based on the color digital image signal from the color sensor receiving the light reflected from the reference member with the light source turned on and calculates monochrome gain setting condition for the monochrome image signal from the color gain setting condition.

3. The image reading apparatus according to claim 1, wherein the color sensor comprises a red, a green and a blue image sensors,
   wherein the AD converting portion has a plurality of analog-digital converters constructed to convert color image signals from the red, the green and the blue image sensors into digital color image signals, and
   wherein the monochrome image signal is converted into a digital monochrome image signal by use of at least one of the plurality of analog-digital converters.

4. A method of reading an image on an original, comprising:
   illuminating the original by a light source;
   outputting a color image signal by a color sensor receiving light reflected from the original illuminated by the light source;
   outputting a monochrome image signal by a monochrome sensor receiving light reflected from the original illuminated by the light source;
   converting the color image signal from the color sensor to a color digital image signal based on a first black level by an AD converting portion;
   converting the monochrome image signal from the monochrome sensor to a monochrome digital image signal based on a second black level by the AD converting portion;
   setting the first black level based on a color digital image signal from the color sensor with the light source turned off;
   setting a first light intensity setting value of the light source for reading an image using the color sensor based on a color digital image signal from the color sensor receiving light reflected from a reference member with the light source turned on;
   setting the second black level based on a monochrome image digital signal from the monochrome sensor with the light source turned off; and
   calculating a second light intensity setting value of the light source for reading an image using the monochrome sensor from the first light intensity setting value.

5. The method according to claim 4, further comprising:
   amplifying the color image signal using color gain setting condition;
   amplifying the monochrome image signal using monochrome gain setting condition;
   setting the color gain setting condition based on the color digital image signal from the color sensor receiving the light reflected from the reference member with the light source turned on; and
   calculating the monochrome gain setting condition from the color gain setting condition.

6. The method according to claim 4, wherein the color sensor comprises a red, a green and a blue image sensors,
   wherein the converting the color image signal comprises converting color image signals from the red, the green and the blue image sensors into digital color image signals by a plurality of analog-digital converters, and
   wherein the converting the monochrome image signal comprises converting the monochrome image signal into a digital monochrome image signal by use of at least one of the plurality of analog-digital converters.

* * * * *